US011905734B2

(12) United States Patent
Davies

(10) Patent No.: US 11,905,734 B2
(45) Date of Patent: Feb. 20, 2024

(54) BOLT MODULE

(71) Applicant: SURELOCK McGILL LIMITED, Berkshire (GB)

(72) Inventor: Glen Davies, Berkshire (GB)

(73) Assignee: SURELOCK McGILL LIMITED, Berkshire (GB)

( * ) Notice: Subject to any disclaimer, the term of this patent is extended or adjusted under 35 U.S.C. 154(b) by 0 days.

(21) Appl. No.: 17/534,676

(22) Filed: Nov. 24, 2021

(65) Prior Publication Data

US 2022/0162881 A1 May 26, 2022

(30) Foreign Application Priority Data

Nov. 26, 2020 (GB) .................................... 2018647

(51) Int. Cl.
*E05B 17/20* (2006.01)
*E05C 1/00* (2006.01)
(Continued)

(52) U.S. Cl.
CPC ...... *E05B 17/2003* (2013.01); *E05B 17/2057* (2013.01); *E05B 63/20* (2013.01); *E05C 1/004* (2013.01); *E05C 1/06* (2013.01)

(58) Field of Classification Search
CPC ........... Y10T 292/1018; E05B 17/2003; E05B 17/20; E05B 17/2007; E05B 17/2015;
(Continued)

(56) References Cited

U.S. PATENT DOCUMENTS 1,274,477 A * 8/1918 Warne ..................... E05B 55/00 70/150
2,533,023 A * 12/1950 Lickteig .................. E05B 63/18 70/151 R
(Continued)

FOREIGN PATENT DOCUMENTS

CN 109854081 A * 6/2019 ............... E05B 9/08
CN 209603626 U 11/2019
(Continued)

OTHER PUBLICATIONS

Cn111663859a, Espacenet machine translation, entire document, 2020-09-15 (Year: 2023).*
(Continued)

*Primary Examiner* — Kristina R Fulton
*Assistant Examiner* — Steven A Tullia
(74) *Attorney, Agent, or Firm* — Troutman Pepper Hamilton Sanders LLP; Christopher C. Close, Jr.; Brandon M. Reed

(57) ABSTRACT

A bolt module is disclosed. The bolt module comprises: a bolt moveable between a thrown position and a retracted position; an anti-thrust member moveable between a release position in which the bolt can be retracted and a plurality of blocking positions obstructing driving back of the bolt under action of an external force on the bolt and, a first rotor assembly capable of accepting a drive element, the first rotor assembly arranged to drive the bolt and to move the anti-thrust member between the plurality of blocking positions and the release position. Each of the plurality of blocking positions may respectively limit to different extents the driving back of the bolt under action of an external force on the bolt. There is also disclosed a leaf or door comprising the bolt module, wherein the bolt module is mounted on the leaf or door for securing the leaf or door.

26 Claims, 16 Drawing Sheets

(51) Int. Cl.
*E05C 1/06* (2006.01)
*E05B 63/20* (2006.01)

(58) Field of Classification Search
CPC ............... E05B 17/203; E05B 17/2038; E05B 17/2049; E05B 17/2057; E05B 17/2084; E05B 17/042; E05B 17/2019; E05B 55/00; E05B 63/08; E05B 63/18; E05B 63/185; E05B 2017/043; E05B 2047/002; E05B 2047/0021; E05C 1/004; E05C 1/06; E05C 1/00; E05C 1/02
See application file for complete search history.

(56) References Cited

U.S. PATENT DOCUMENTS

| | | | | | | |
|---|---|---|---|---|---|---|
| 4,154,070 | A | * | 5/1979 | Bahry | E05C 9/06 | 70/120 |
| 4,248,068 | A | * | 2/1981 | Esser | E05B 63/0017 | 70/389 |
| 4,502,716 | A | * | 3/1985 | Tsai | E05B 63/0017 | 292/172 |
| 4,583,382 | A | * | 4/1986 | Hull | E05B 59/00 | 70/107 |
| 5,469,723 | A | * | 11/1995 | Litwin | E05B 55/00 | 70/387 |
| 5,865,479 | A | * | 2/1999 | Viney | E05C 9/041 | 70/DIG. 42 |
| 5,927,769 | A | * | 7/1999 | Pullen | E05B 17/2038 | 292/192 |
| 7,007,985 | B2 | * | 3/2006 | Alexander | E05B 59/00 | 70/486 |
| 7,017,379 | B1 | | 3/2006 | Hsieh | | |
| 9,719,278 | B2 | * | 8/2017 | Taylor | E05B 47/0001 | |
| 2016/0060905 | A1 | * | 3/2016 | Shiu | E05B 59/00 | 292/33 |

FOREIGN PATENT DOCUMENTS

| | | | | | |
|---|---|---|---|---|---|
| CN | 111395870 | A | * | 7/2020 | E05B 15/004 |
| CN | 111663859 | A | * | 9/2020 | E05B 15/10 |
| CN | 111927221 | A | * | 11/2020 | E05B 17/2007 |
| CN | 112727249 | A | * | 4/2021 | E05B 15/00 |
| DE | 4025059 | A1 | * | 8/1990 | E05B 59/00 |
| DE | 29717053 | U1 | * | 10/1997 | E05B 63/0056 |
| DE | 202013006044 | U1 | * | 9/2013 | E05B 15/004 |
| EP | 3543440 | A1 | * | 9/2019 | E05B 17/226 |
| FR | 2632340 | A1 | * | 6/1988 | |
| FR | 2711713 | A1 | * | 5/1995 | E05B 15/1614 |
| FR | 2761395 | A1 | * | 10/1998 | E05B 15/10 |
| FR | 2796096 | A1 | * | 1/2001 | E05B 9/045 |
| FR | 2826682 | A1 | * | 1/2003 | E05B 63/185 |
| GB | 636464 | A | | 5/1950 | |
| KR | 100404749 | B1 | * | 4/2001 | E05B 15/1614 |
| KR | 200363386 | Y1 | * | 4/2006 | E05B 47/00 |
| KR | 20100050048 | A | * | 11/2008 | E05B 9/08 |
| KR | 20110048400 | A | * | 11/2009 | E05B 15/00 |
| WO | WO-2014086888 | A1 | * | 6/2014 | E05B 17/2084 |
| WO | WO-2018179529 | A1 | * | 10/2018 | E05B 15/02 |

OTHER PUBLICATIONS

CN111663859A, Espacenet machine translation, entire document, Sep. 15, 2020 (Year: 2023).*

* cited by examiner

BOLT MODULE

CROSS REFERENCE TO RELATED APPLICATIONS

This application claims priority to GB Application No. 2018647.4, filed Nov. 26, 2020, which is incorporated herein by reference in its entirety.

TECHNICAL FIELD

The present invention relates to a bolt module for controlling access, for example to a room or building. The bolt module may be used as part of a lock system in which control of the bolt of the bolt module can be configured differently on the two sides of a leaf or door. The bolt module may include an anti-thrust mechanism for preventing driving back of the bolt and a bolt restraint mechanism.

BACKGROUND

In complex entry situations there is a need to have locking systems that are flexible and can be configured to suit the situation. Such systems may require one or more levels of access control and yet be provided with emergency egress to allow persons to safely leave the building in an emergency. One such lock system is that described in United Kingdom Patent GB 2520666 B for the current applicant. GB 2520666 B is incorporated by reference herein. The lock system described therein comprises a bolt module that is controlled by two locking modules. In the arrangement described therein the locking modules may lock the bolt module to provide two levels of access control. We now use the example of securing a room or site and limiting access even for authorised persons. Here a security manager may operate one of the locking modules at the start and end of weekdays to generally allow access to the site for authorised persons. This locking module may take many forms but one is the combination lock. On operating the combination lock the first level of security is released. Persons such as contractors or other workers wishing to gain entry to the room or site can enter by operating the second locking module. This may be a conventional cylinder key lock or may be by an access card. Once this second level of security has been released a handle on the bolt module may be turned to gain entry. On the other side of the door a handle may provide emergency exit or egress from the site or room at any time, whether first and/or second locking modules are secured or not.

One of the problems of such locking systems and bolt modules, and is also the case for more conventional locks, is that an unauthorised person wanting to gain entry may tamper with the bolt to try to gain entry. One method of this is to try to push back the bolt such that it is no longer held in the keep or receiver on the frame.

Other problems encountered with this and other types of locking system is that if the bolt is a deadbolt it may be desirable to restrain the bolt in the bolt module such that it is maintained in the retracted position until the door is closed. For example, this may avoid the deadbolt hitting the door frame or door jamb as the door is closed. This may also prevent further tampering with the bolt.

Other systems in which restraint of the bolt is desirable are multi-point locking systems in which multiple bolts are driven in different directions by a central bolt module. In such systems it is desirable to restrain the bolt in the retracted position, for example to prevent dragging of one of the bolts along the floor as the door is closed. With multiple bolts it is also desirable to have an anti-thrust mechanism that prevents driving back of the bolts to gain unauthorised entry.

These problems also occur on more conventional locks and bolts.

Furthermore poor installation of the bolt module or tampering with the keeper or receiver in which the bolt is thrown can increase the vulnerability of bolt modules when locked.

SUMMARY OF THE INVENTION

The present invention provides a bolt module comprising a bolt moveable between a thrown position and a retracted position; an anti-thrust member moveable between a release position in which the bolt can be retracted and a plurality of blocking positions obstructing driving back of the bolt under action of an external force on the bolt and, a first rotor assembly capable of accepting a drive element, the first rotor assembly arranged to drive the bolt and to move the anti-thrust member between the plurality of blocking positions and the release position. The multiple blocking positions are provided to prevent driving back of the bolt not only if the bolt has been fully thrown, but also if the bolt is partially thrown or retracted.

Each of the plurality of blocking positions may respectively limit to different extents the driving back of the bolt under action of an external force on the bolt. That is each of the plurality of blocking positions may limit or block pushing back of the bolt into the bolt module whether the bolt is thrown, or at a partially thrown or retracted position. By pushing back, we mean that a force is applied to the end of the bolt with the aim of urging the bolt towards the retracted position by a sufficient amount that it will clear the keeper of receiver on the door frame, and unauthorised entry may be made.

The first rotor assembly may be arranged to move the anti-thrust member between a first blocking position, a second blocking position and a release position, wherein the first blocking position obstructs or limits driving back of the bolt when the bolt is at the thrown position. The second blocking position obstructs or limits driving back of the bolt when the bolt is at a first partially retracted position. The first blocking position and second blocking position may provide different parts of the anti-thrust member such as different stopping faces for preventing driving back of the bolt at the respective positions.

The first rotor assembly may be arranged to move the anti-thrust member between a first blocking position, a second blocking position, a third blocking position and a release position, wherein the third blocking position obstructs or limits driving back of the bolt when the bolt is at a second partially retracted position in which the bolt is retracted further than when at the first partially retracted position.

The anti-thrust member may comprise a plurality of stopping faces against which movement of the bolt is obstructed. Different stopping faces may be used for blocking the bolt at different positions such as fully thrown and a first partially retracted position.

The bolt may have a back face and the anti-thrust member may be arranged such that the back face is respectively obstructed by one of the stopping faces of the anti-thrust member dependent on whether bolt is thrown or partially retracted.

The plurality of stopping faces form a series of steps providing respective positions into which the bolt is received and movement is obstructed. The series of steps provides blocking at increasingly retracted positions of the bolt as the antithrust member is moved increasingly from the path of the bolt.

The bolt module may further comprise a bolt restraint latch and trigger. The bolt restraint latch may be configured to operate on the bolt and engage with the bolt when the bolt is moved to the retracted position so as to restrain the bolt in that position, and the trigger extending from the bolt module may be arranged such that on striking of the trigger the trigger pushes against the bolt restraint latch releasing the bolt.

The restraint latch may comprise a plurality of restraint fingers configured to operate on the bolt and engage with the bolt. Each of the fingers may be configured to come into engagement, that is slot into a recess in the bolt, with the bolt at different partial retraction positions of the bolt to restrain the bolt in that position. Although the bolt may be driven through a continuous range of movement between the thrown and retracted positions, each of the restraint fingers will engage, or be urged, into the recess in the bolt at different discrete positions of the bolt as the bolt is released and moves towards the thrown position. In this way the restraint fingers may be considered to act as ratchet restraining movement of the bolt in a stepwise manner.

The restraint fingers may be arranged such that the further the bolt is retracted the greater the number of restraint fingers engage with the bolt.

The bolt may comprise a restraint shoulder or notch, and the restraint fingers may be biased to slide into a recess behind the shoulder as the bolt is retracted.

The fingers may comprise tabs for engaging with the bolt, that is moving into a recess in the bolt. Each of the tabs may have an operative face, or edge, which is respectively spaced coplanar from the tabs of the other fingers to provide engagement with the recess of the bolt at different respective positions of the bolt.

The trigger may be arranged such that on striking the trigger the trigger pushes against the fingers to retract the fingers from the recess and release the bolt.

The anti-thrust member and restraint fingers may be arranged such that when at least one of the fingers engages in the recess in the bolt, the anti-thrust member is at one of the blocking positions blocking driving back of the bolt from a partially retracted position. This arrangement constrains movement of the bolt in both the back and forth or throwing and retracting positions, to minimise tampering with the bolt.

The bolt and first rotor assembly may be arranged such that there is lost motion there between when an external force is applied on the bolt to drive back the bolt. This may be such that the rotor assembly is not driven by the action of the external force.

The bolt module may further comprise a slider arranged to transmit motion from the first rotor assembly to the bolt and including said lost motion between the bolt and slider such that the first rotor assembly is not driven when an external force is applied on the bolt.

The anti-thrust member may be biased to drive the first rotor assembly to throw the bolt.

The first rotor assembly may comprise an inside rotor capable of accepting an inside drive element and an outside rotor capable of accepting an outside drive element, the inside rotor and outside rotor may be arranged for rotation about a common axis and having lost-motion there between.

The bolt module may further comprise a second rotor assembly, the first and second rotor assemblies may be disposed on opposing sides of the bolt, each rotor assembly being capable of accepting drive elements each for driving the bolt between the thrown and retracted positions. The rotor assemblies may be arranged such that to retract the bolt, a drive element accepted by the first rotor assembly is rotated in an opposite direction to a drive element accepted by the second rotor assembly.

The slider may be arranged between first and second rotor assemblies for transmitting drive between said rotor assemblies.

The bolt module may be adapted for securing a leaf having an inside and an outside, wherein at least one of the first and second rotor assemblies is capable of accepting both inside and outside drive elements each for driving the bolt between thrown and retracted positions from the respective side.

At least one of the first and second rotor assemblies may be arranged to receive a locking member from a locking module, said rotor assembly arranged such that at least part of said rotor assembly is for locking by the locking member so as to prevent the outside drive element from driving the bolt.

The present invention further provides a bolt module comprising: a bolt moveable between a thrown position, a partially retracted position and a retracted position; a first rotor assembly capable of accepting a drive element, the first rotor assembly arranged to drive the bolt between the thrown position, the partially retracted position and the retracted position; and a bolt restraint latch and trigger, the bolt restraint latch configured to operate on the bolt and engage with the bolt when the bolt is moved to a retracted position, or a partially retracted position, so as to restrain the bolt in that position, and the trigger extending from the bolt module and arranged such that on striking of the trigger the trigger pushes against the bolt restraint latch releasing the bolt.

The restraint latch may comprise a plurality of restraint fingers configured to operate on the bolt and engage with the bolt, each of the fingers configured come into engagement with the bolt at different retraction positions of the bolt to restrain the bolt in that position. The present invention further provides a leaf or door comprising the bolt module described herein, wherein the bolt module is mounted on the leaf for securing the leaf or door.

In further examples of the bolt module described herein, a rotor assembly may have an inside rotor and an outside rotor. The outside rotor may be arranged to be locked by a first or second locking module, and the inside rotor may be arranged to retract the bolt when driven by the inside drive element independently of whether the outside rotor is locked.

The bolt may be arranged to be driven by the rotor assemblies by action of a slider on the bolt. The slider may be arranged to transmit motion of a rotor assembly to the bolt and including lost motion between the bolt and slider such that the rotor assembly is not driven when an external force is applied on the bolt.

The slider may be an outside slider arranged to be operated on by at least one outside rotor. The bolt module may further comprise an inside slider arranged to transmit motion of an inside rotor to retract the bolt including lost motion between the bolt and inside slider such that the inside rotor is not driven when an external force is applied on the bolt. The sliders may be arranged to have lost motion with the bolt such that on driving the bolt by an inside rotor, the outside slider and outside rotors are not moved.

The outside rotor may have a stopping shoulder arranged to be operated on by a locking module to stop rotation of the outside rotor when the locking module locks said at least a part of the respective rotor assembly.

The slider may transmit rotation from one rotor assembly to the other such when the first rotor assembly is rotated to retract the bolt the direction of rotation is opposite to the direction of rotation of the second rotor assembly for retracting the bolt.

The anti-thrust member may operate on an outside rotor. The bolt module may further comprise a bias member operating on an inside rotor to bias the bolt to the thrown position. The bias member may provide anti-thrust to prevent driving back of the bolt when an external force is applied on the bolt.

BRIEF DESCRIPTION OF THE DRAWINGS

Embodiments of the present invention will now be described with reference to the accompanying drawings, of which.

DETAILED DESCRIPTION

Figure 1:
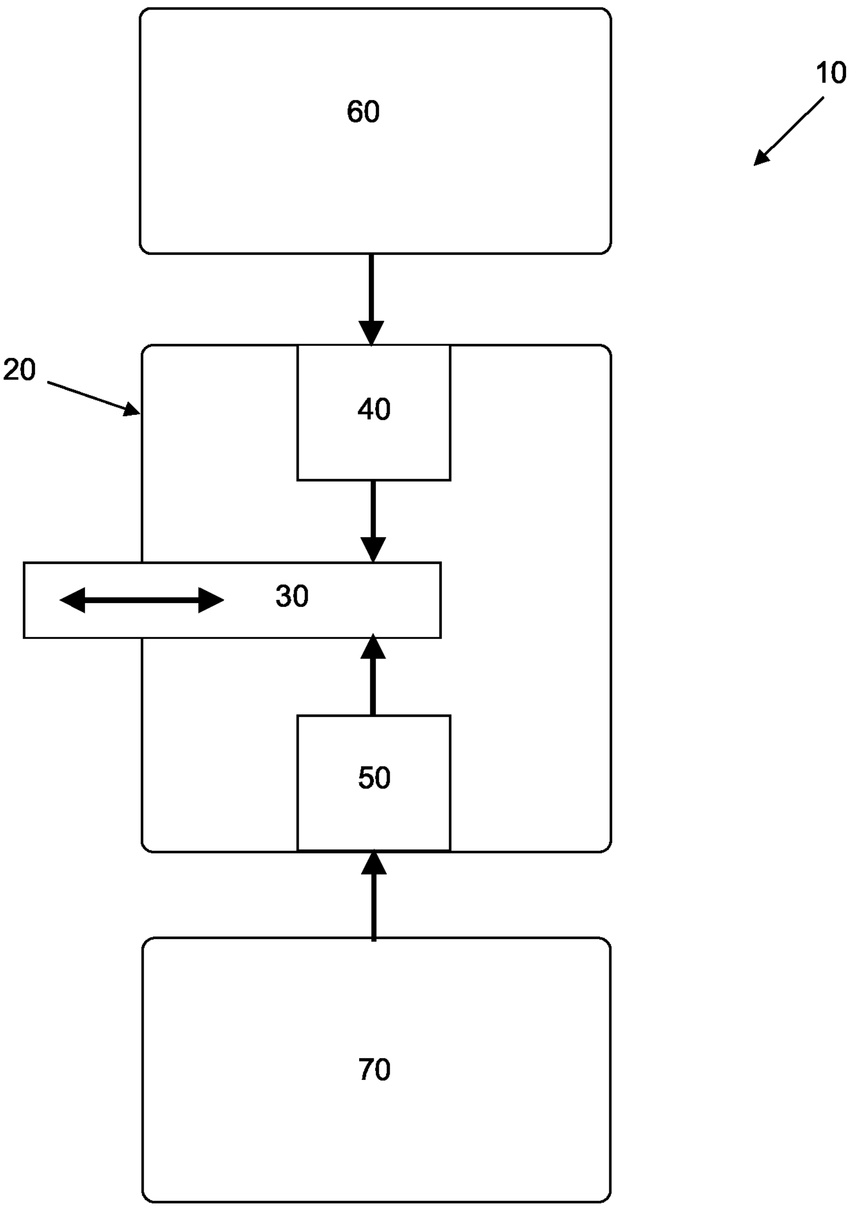
FIG. 1 is a schematic diagram of a lock system.

FIG. 1 is schematic diagram of a lock system 10. The lock system is for mounting on a door or other leaf for securing the door or leaf in a closed position. The lock system comprises a bolt module 20 having a bolt 30 arranged to be driven between a thrown position in which the bolt extends so as to secure a leaf. The leaf has an inside and an outside. Although we have described in the background section that the door is at the boundary of a room or site securing entry and exit, it is alternatively envisaged that the door may be within a building such as proving controlled access and emergency egress into and out of a secure room. The system may also be used in other circumstances.

The bolt module 20 has rotor assemblies disposed on opposite sides of the bolt. The first rotor assembly 40 is shown above the bolt and the second rotor assembly 50 is shown below the bolt. Other arrangements are possible for the first and second rotor assemblies. The rotor assemblies are each arranged for operating the bolt 30, namely for moving the bolt between thrown and retracted positions. Each rotor assembly is capable of accepting drive elements from both sides of the leaf or bolt module, that is, from the inside and the outside. When driven the drive elements drive the respective rotor assembly, or part thereof, to move the bolt between the thrown and retracted positions.

Each rotor assembly can therefore receive two drive elements, one for inside and one for outside. In total the bolt module may therefore receive four drive elements. However, it is expected that not all drive elements will be implemented in any given situation, but more likely one drive element will be provided on each side of the leaf, for actuation from inside and outside. In preferred embodiments the capability of additional or alternative drive elements are used for providing a reversible/invertible bolt system, whereby the direction of rotation of the drive elements can be selected according to the handedness of the door and without disassembly of the bolt module.

The lock system 10 also comprises a first locking module 60 and a second locking module 70. Both of the locking modules are arranged to operate on the bolt module 20. The first locking module 60 operates on the first rotor assembly 40, and the second locking module 70 operates on the second rotor assembly 50. Each of the locking modules 60, 70 is operable to lock at least a part of the respective rotor assembly 40, 50, said locking operating on the part of the rotor assembly driven by the outside drive element. Hence, this arrangement permits egress from the inside side of the locking module and leaf, for example, in an emergency by actuating a push pad, panic bar or touch bar. When locked the arrangement prevents the outside drive elements from driving the bolt, until the locking module is released. Locking of one or both of the locking modules prevents the bolt from being released.

The rotor assemblies 40, 50 are arranged such that to retract the bolt a drive element accepted by the first rotor assembly 40 is rotated in an opposite direction to a drive element accepted by the second rotor assembly 50. This provides invertible driving or reversible driving, without requiring disassembly, as we will now describe with reference to FIG. 1. A shown in FIG. 1, the bolt 30 protrudes to the left of the bolt module 20 when in the thrown position. The first rotor assembly 40 is arranged such that retraction of the bolt 30 is achieved by rotating a drive element accepted by the first rotor assembly 40 in an anticlockwise direction. The second rotor assembly 50 is arranged such that retraction of the bolt 30 is achieved by rotating a drive element accepted by the second rotor assembly 50 in a clockwise direction. The direction of driving to retract the bolt can therefore be selected by choosing to use a drive element with the first rotor assembly or the second rotor assembly. If it is desirable to have the bolt to be thrown on the right hand side of the bolt module 20, the whole bolt module can be rotated half a turn so that the bolt points to the right. Again a choice of driving direction is provided by selecting between the first and second rotors assemblies 40, 50. This reversible or invertible drive is provided for inside and outside driving.

Preferably the bolt module 10 also comprises an anti-thrust assembly (not shown in FIG. 1) which operates to block reverse driving of the bolt 30 by an external force on the end of the bolt. The anti-thrust assembly is released from acting on the bolt when a rotor assembly is driven.

Figure 2:
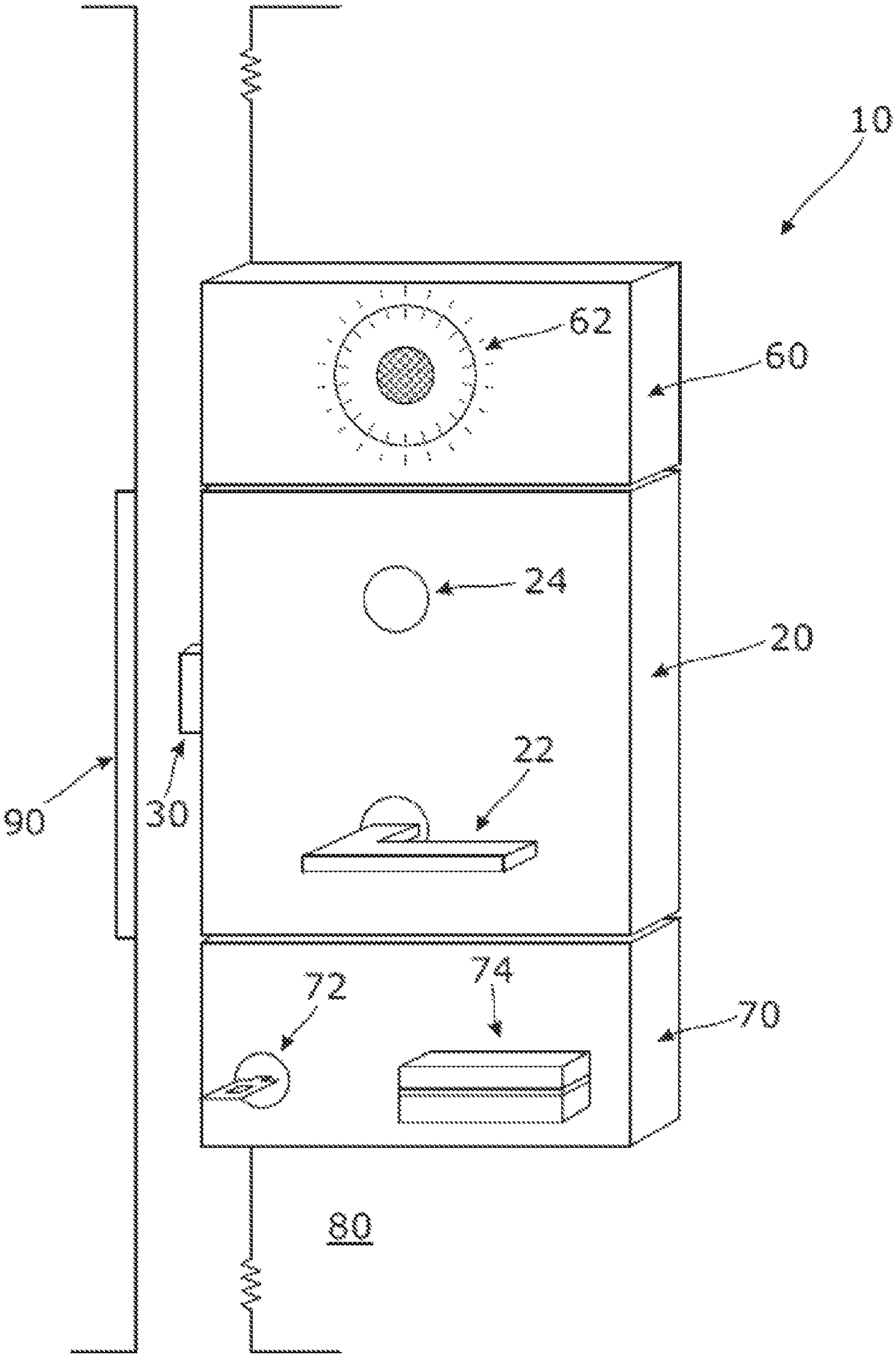
FIG. 2 is a perspective diagram showing an example implementation of the lock system of FIG. 1.

FIG. 2 shows an example implementation of the lock system 10. In this example, the lock system is mounted on a leaf 80. The bolt 30 of the bolt module is thrown into keeper 90 to secure the leaf closed. The bolt module 20 of the lock system 10 is provided with a handle 22 as a drive element. The drive element is arranged for driving of the outer side of the lower rotor assembly in the bolt module 30. This corresponds to the second rotor assembly 50 of FIG. 1. Driving of the upper rotor assembly 40 is covered off by a blanking plate 24. The lock system 10 also comprises first and second locking modules 60, 70 which in this example are a combination lock and access control unit. The combination lock is a rotary type combination lock such as may have a dial with numeric symbols around the circumference. Such a combination lock is based on a conventional combination lock in which the lock is released by turning the dial in opposing directions to a series of codes. Conventionally, release may trigger various actions to allow opening of a door, for example a safe door. In this example, release sends a signal, retracts a bolt or otherwise interacts with the bolt module to release at least a part of the first rotor assembly.

As mentioned above, the second locking module may be an access control unit. This may take various forms such as a numeric key pad, fingerprint identifier, card swipe etc. In FIG. 2 the example shows a card reader 74 across which a key card is swiped and read. The key card may comprise a magnetic strip or smart chip which stores a code or identification information. On reading this code or identification information the access control unit determines if access is to be allowed. The access control unit preferably includes a mechanical key override 72. The override may be used, for example, if there is a power loss to the access control module.

Operation of the exemplary lock system shown in FIG. 2 will now be described using the example of control access to a secure room. In this example, at the start of a day the locking modules 60 and 70 are in the locked position and the bolt 30 of the bolt module is in the thrown position securing the leaf closed. If the day is a weekday a security manager may enter the correct code into the combination lock releasing the locking action of the first locking module 60 on the first rotor assembly of the bolt module 20. This releases the first level of security. At the end of the day, the combination lock is reactivated such that the first locking module locks the bolt module. Hence, if the security manager is not in the office, such as at a weekend or evening, the first locking module will lock the bolt module. The bolt will be locked in the thrown position. Locking of the bolt module prevents authorised users who have an appropriate swipe card or know the key code for the access control unit from gaining entry, for example, out of office hours. To gain access both locking modules must be released thereby providing two levels of security.

A small number of users or the security manager may carry the mechanical override key of the access control unit which overrides operation of the card reader or key pad etc. This may be used for example if the access control unit has failed, perhaps due to loss of power, or has been tampered with.

After both locking modules 60, 70 have been released the handle 22 can be actuated to drive the second rotor assembly and retract the bolt 30 thereby permitting entry.

The direction of rotation of the handle will be clockwise for the lock system orientation shown in FIG. 2. The handle actuates the second rotor assembly. If anti-clockwise rotation of the handle is required for retraction of the bolt, then the handle 22 should be swapped to the first rotor assembly by removing blanking plate 24 and using the handle to drive the first rotor assembly.

FIG. 2 shows a leaf with the lock system on the left hand side. For operation on the right hand side of a leaf the lock system can be inverted. For example, by rotating the bolt module 20 by half a turn the bolt 30 will be on the right hand side. If the handle had been coupled as shown in FIG. 2 to the second (lower) rotor assembly, after inversion the handle will be at the upper rotor assembly. Although the direction of rotation for withdrawing the bolt is unchanged, it may be desirable to also reverse the direction of rotation. This can be achieved by swapping the handle to the other rotor assembly. No disassembly of the bolt module 20 itself is required.

The lock system 10 comprises first and second locking modules 60, 70 as well as bolt module. It is envisaged that upon installation of the lock system, the bolt module will be installed first with the required orientation to match the door. The first and second locking modules are then installed. Although the interaction with the bolt module is unaffected whether, for example, the combination lock is the locking module above or below the bolt module, because of symbols or writing on the locking modules it may be desirable to fit the combination lock as the upper module. Similar considerations may apply to the second locking module.

Although we have described the first and second locking modules as respectively arranged above and below the bolt module, the bolt module may take other orientations depending on the leaf to which it is attached. For example, the bolt module may be arranged with the bolt operating upwards or downwards and the locking modules arranged at the sides.

Other types of locking modules are also envisaged such as requiring multiples mechanical keys or biometric information. The locking modules may be mechanical, electrical or a mixture of both.

Although FIG. 2 shows the bolt module and locking modules on the outside of a door for entering a room, they may be instead mounted on the inside of the door, with extended drive through the door and with those features requiring interaction with a user extending to the outside, for example the combination dial 62, handle 22, access control unit 74 and mechanical key override 72.

Figure 3:
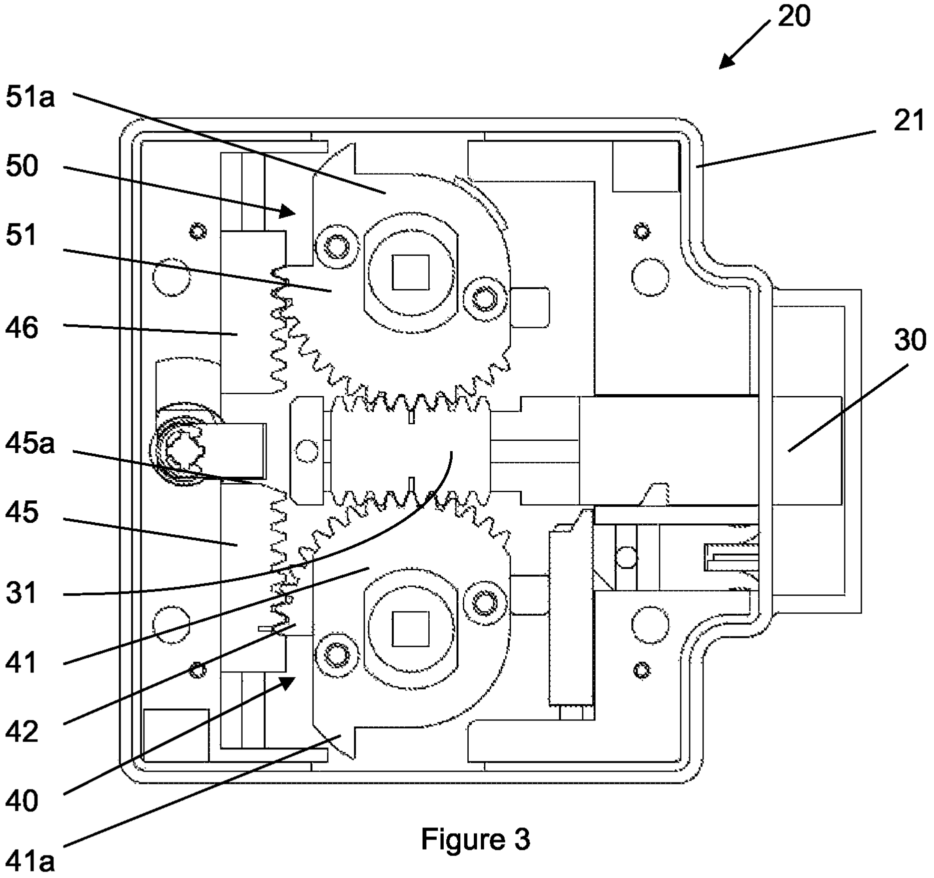
FIG. 3 is a plan view inside a bolt module showing internal components, with the bolt in the thrown position.
Figure 4:
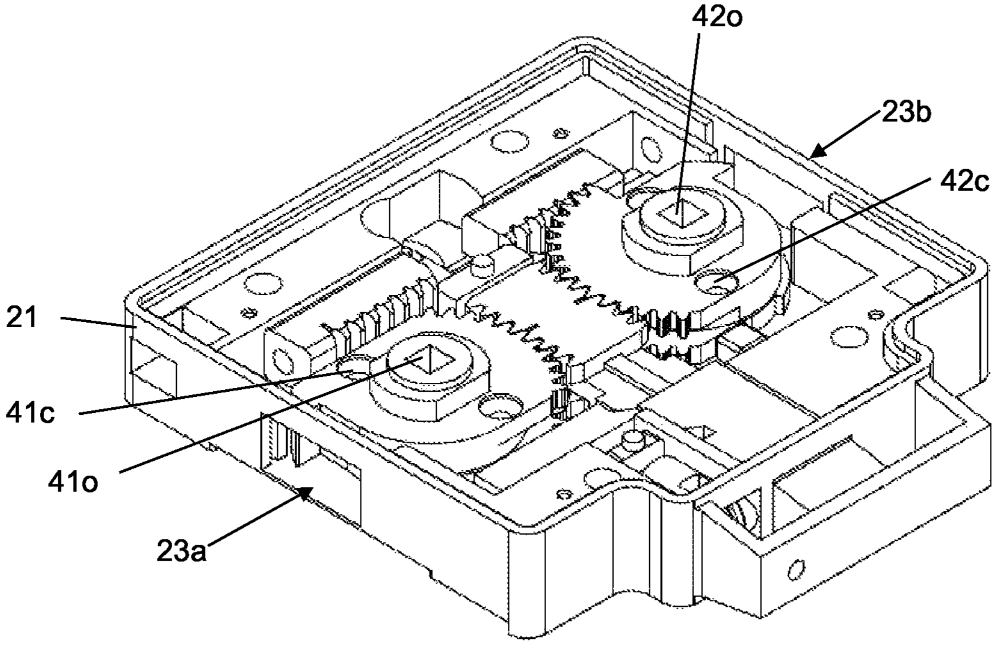
FIG. 4 is a perspective view of the bolt module shown in FIG. 3.
Figure 5:
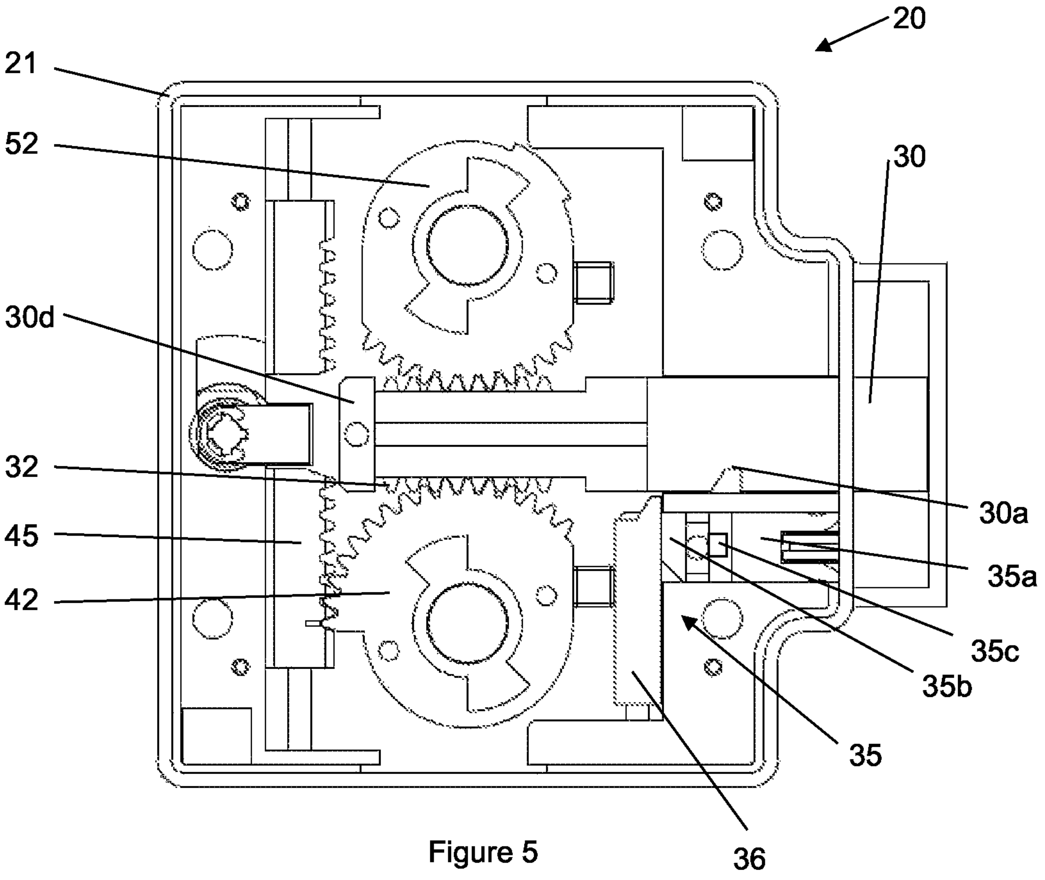
FIG. 5 is a plan view inside the bolt module of FIG. 3 showing internal components, with outside rotors and slider removed, and the bolt in the thrown position.
Figure 6:
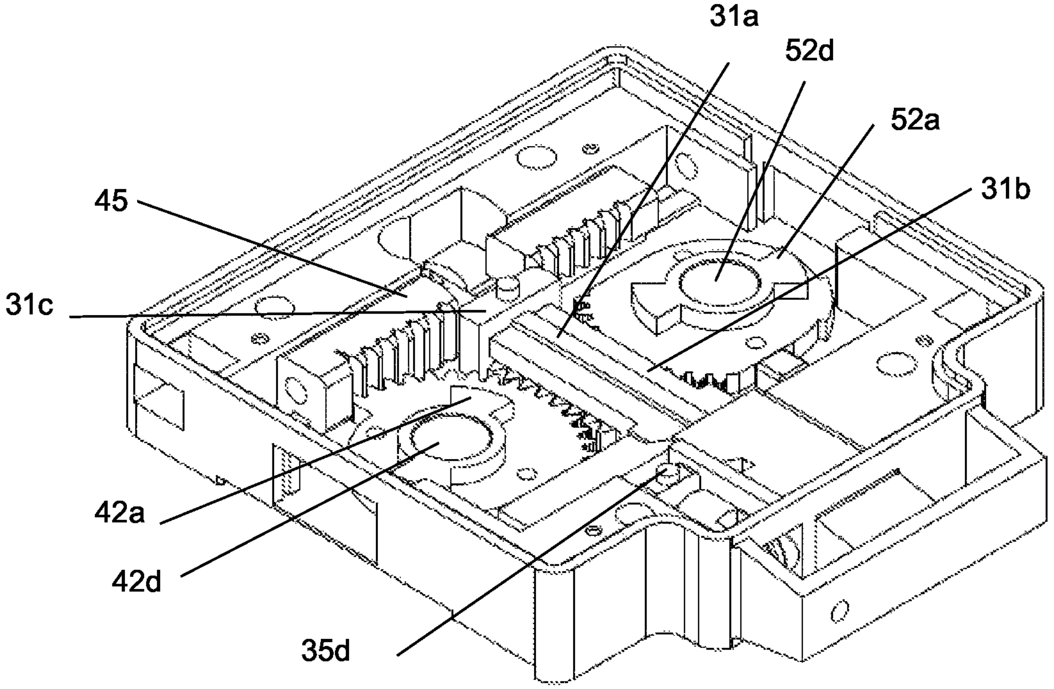
FIG. 6 is a perspective view of the bolt module of FIG. 5 showing internal components, with outside rotors and slider removed, and the bolt in the thrown position.
Figure 7A:
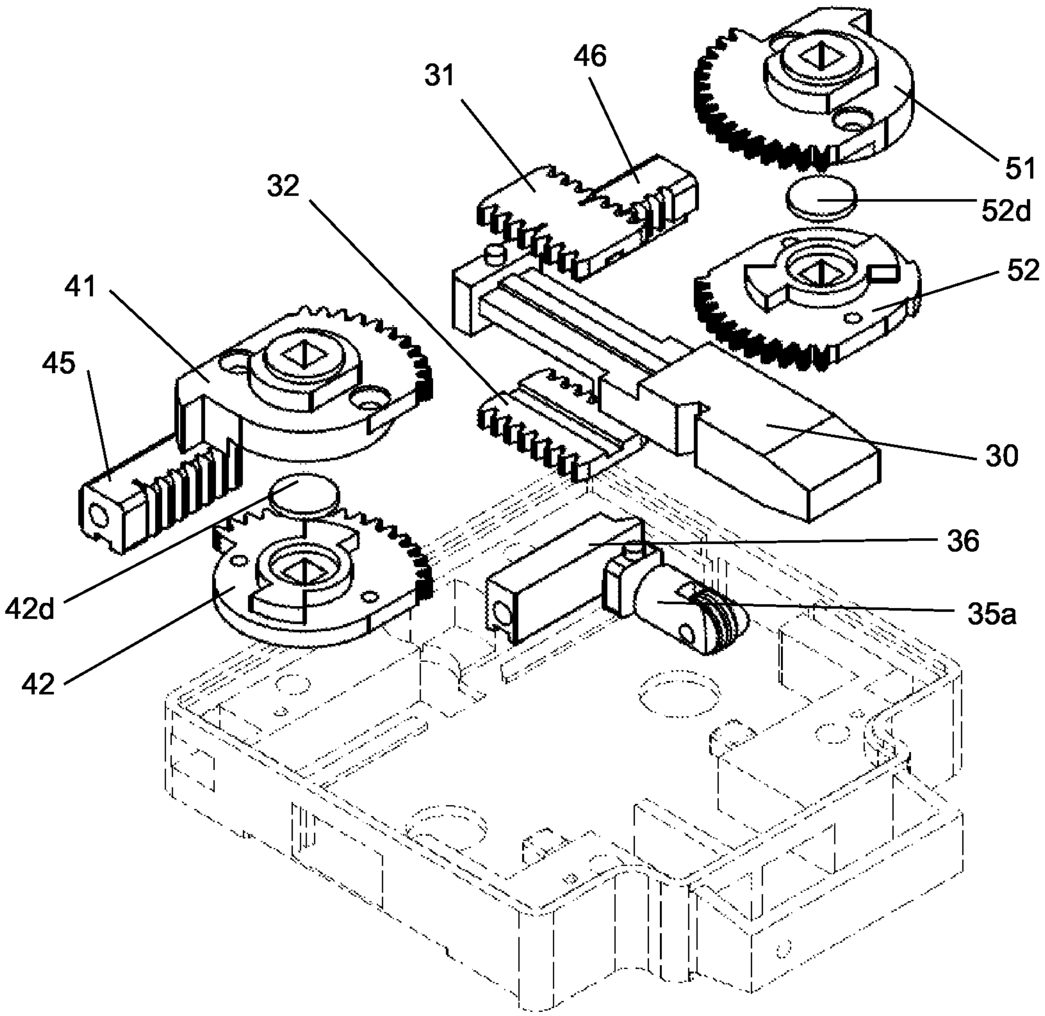
FIG. 7*a* is an exploded view of the bolt module of FIG. 3.

FIGS. 3 and 4 are respectively plan and perspective views of the bolt module 20 with a cover or housing panel removed. FIGS. 5 and 6 are plan and perspective views similar to FIGS. 3 and 4 but with the outside set of rotors (and slider) removed to show more clearly the internals of the bolt module. FIG. 7*a* is an exploded view of the bolt module showing many of the components in more detail than in FIGS. 3-6.

In FIG. 3 the bolt 30 can be seen in the thrown position. The bolt extends inwards into the module and much of the distance across the inside of the bolt module. Inside the bolt module the bolt has a recess 31*a* (see FIGS. 6 and 7*a*) and ends with a shoulder part 31*c*. The bolt may have a guide pin 30*d* which is guided by a slot in cover (not shown in FIGS. 3-6). Inside the bolt module can be seen the outside rotors 41, 51 of the first 40 and second 50 rotor assemblies. Shown below the bolt in FIG. 3 is the outside rotor 41 of the first rotor assembly 40. Above the bolt is shown the outside rotor 51 of the second rotor assembly 50. In the embodiment shown in FIG. 3, the rotors are gears with teeth which engage with other gears or racks. In other embodiments the rotors may be coupled to neighbouring components by levers or belts. Returning to FIG. 3 the inside rotor 42 of the first rotor assembly 40 can also be seen behind the outside rotor 41. The terms "inside" and "outside" are used here to represent the sides from which the rotors are driven by drive elements, such as handles. This may be, for example, inside and outside of a room.

The inside and outside rotors are arranged to rotate on a common axis but are arranged to be able to rotate with some independence from each other. Each of the outside rotors 41, 51 is adapted to receive a spindle of a drive element. These are received in spindle apertures 41*o* and 51*o* (see FIG. 4). The outside rotors 41, 51 of the first and second rotor assemblies 40, 50 drive a slider 31. In the same was that the bolt module 20 has inside and outside rotors, it also has an inside slider 32 and an outside slider 31. The sliders transfer motion between the first and second rotor assemblies but also between the rotors and the bolt.

The teeth of outside rotor 41 of the first rotor assembly 40 and the teeth of the outside rotor 51 of the second rotor assembly 50 engage with the teeth of outside slider 31. As shown in FIGS. 4 and 6 outside slider 31 fits loosely in a recess 31*b* in the bolt 30. The bolt recess 31*b* also includes a guide 31*a* for guiding the movement of the slider. The guide 31*a* may be a ridge on the bolt 30 which sits in a channel in slider 31. The outside slider and bolt translate freely with respect to each other until the outside slider reaches an end of the recess 31*b*. At this point the slider is moved by the bolt or the bolt is moved by the slider. Hence, it may be considered that there is lost motion between the bolt and slider.

As shown in FIG. 3, the slider 31 comprises a pair of racks each for engagement or meshing with the teeth of the outside rotors or gears of the two rotor assemblies. FIG. 3 also shows two further racks with teeth for engagement with the rotor assemblies. Anti-thrust member 45 is one of those racks and is arranged to be driven by, or for driving of, the first rotor assembly 40. As shown in FIGS. 5 and 6 the teeth of the rack mesh with the teeth of the inside rotor 42 of the first rotor assembly. In the position shown in FIGS. 3 and 5 the anti-thrust member 45 blocks the inward movement of the bolt by end 45*a* of the anti-thrust member.

The other of the two additional racks is a bias member 46 which has teeth meshing with outside rotor 51 of the second rotor assembly, as shown in FIGS. 3 and 4. The bias member is biased to throw the bolt. The bias is provided by spring or resilient means between the housing 21 and an end of the bias member. In FIG. 3 this would be equivalent to a spring means pushing the bias member 46 downwards. The spring means may be a coiled spring or any other suitable spring means such as a lever spring.

Anti-thrust member 45 is also biased in a similar manner by a spring means between the housing 21 and the anti-thrust member. The anti-thrust member 45 is biased into the path of the bolt. In FIG. 3 the spring means may be between the housing and the bottom of the ant-thrust member. The spring means may be, for example, a coiled spring or other suitable spring means as set out above for the bias member. The anti-thrust member also provides biasing to throw the bolt.

In an embodiment different to that shown in FIGS. 3-6 an additional anti-thrust member may be provided which mirrors anti-thrust member 45 and acts in the same way on rotor 52 as anti-thrust member 45 operates on rotor 42. This could be provided instead of bias member 46, or a thinned version of bias member 46 could be provided along with a thinned anti-thrust member such that one is underneath the other.

FIGS. 5 and 6 show the teeth of the inside rotors 42, 52 meshing with inside slider 32 beneath the bolt. Similarly to outside slider 31, inside slider sits in a recess in the underside of the bolt and its movement is guided by a guide on the bolt. The guide again may be formed of a ridge and channel. Different to the outside slider, the inside slider has only a small freedom of movement as the recess is significantly smaller, as shown in FIG. 7*a*.

Each of the rotors differs slightly since none of the rotors has gear teeth around the full circumference of the rotor. This is partly for compactness but also the gears turn less than a quarter turn.

From FIG. 3 there is apparent symmetry between the lower half (first rotor assembly 40 side) of the bolt module and the upper half (second rotor assembly 50 side).

Figure 7B:
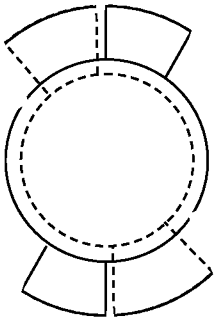
FIG. 7*b* is a schematic diagram of the device for lost motion between inside and outside rotors.

Inside rotors and outside rotors have lost motion between them such that the inside rotor can be turned without turning the outside rotor. Conversely, if the outside rotor is turned this will drive the inside rotor. Lost-motion in this way is present for both the first rotor assembly 40 and second rotor assembly 50. The spindle aperture for each outside rotor is not continuous with that of each inside rotor. Although they lie on the same axis a blocking disc 42*d*, 52*d* sits in a recess between the two rotors preventing a spindle of a drive element from engaging with both rotors directly. The lost motion is provided by lost motion device 42*a*, 52*a* on the inside rotors 42, 52 operating with a lost motion recess in the adjacent side of the outside rotor 41, 51. In the embodiment of FIGS. 5 and 6, the lost motion device comprises a bow-tie shape raised part or protrusion in the disc surface of the inside rotor. In the outside rotor there is provided a similar bow-tie shaped recess. As can be seen in FIG. 6 each of the two bow-tie ends form an arc of, at most, ⅛ of a circle. The corresponding recess in the outside rotor is slightly larger, taking up more of an arc, for example ⅙ or ¼ of an arc. FIG. 7*b* shows how the bow-ties parts interact such that when turned form one side both rotors turn together, whereas from the other side only one rotor turns. In other embodiments the lost motion may be provided by pins in slots or other suitable means.

Each of the outside rotors 41, 51 also comprises a stopping shoulder 41*a*, 51*a*. In FIG. 3 the bolt and mechanism of the bolt module are shown in the thrown position. In this position the stopping shoulder is at rest close to an aperture 23*a* or 23*b* in the housing so that it can be operated on by a locking module. The stopping shoulder is a protrusion extending from the disc of the rotor, and preferably extends further than the teeth. In other embodiments the stopping shoulder may take other forms.

The rotors also comprise connection apertures 42*c* as shown in FIG. 4, or other connection devices. The connection apertures are for receiving screws or bolts to link the inside and outside rotors together. A screw or bolt may be inserted or screwed through the aperture of the outside rotor and into a corresponding aperture of the inside rotor. The outside and inside rotors are then linked together. Other methods of linking the outside and inside rotors together may instead be provided. There may be implementations where it is advantages to link the inside and outside rotors of one of the rotor assemblies in this way. Connection apertures are provided in both of the rotor assemblies. This makes it possible to connect together inside and outside rotors for either rotor assembly, and hence may be set according to reversible operation. It is also possible to lock inside and outside rotors for both rotor assemblies.

We now describe operation of the bolt module 20 based on FIGS. 3-6. As mentioned above, in these figures the bolt and mechanism are in the thrown position with the bolt extended from the module, such as into a keeper in the fixed frame or jamb of a door or leaf. The bolt can be retracted by turning a drive element inserted in any of the rotors, if the locking modules are unlocked or not present. For simplicity we consider this arrangement first and we consider in turn insertion and actuation of a drive element into each of the four rotors.

Figure 8:
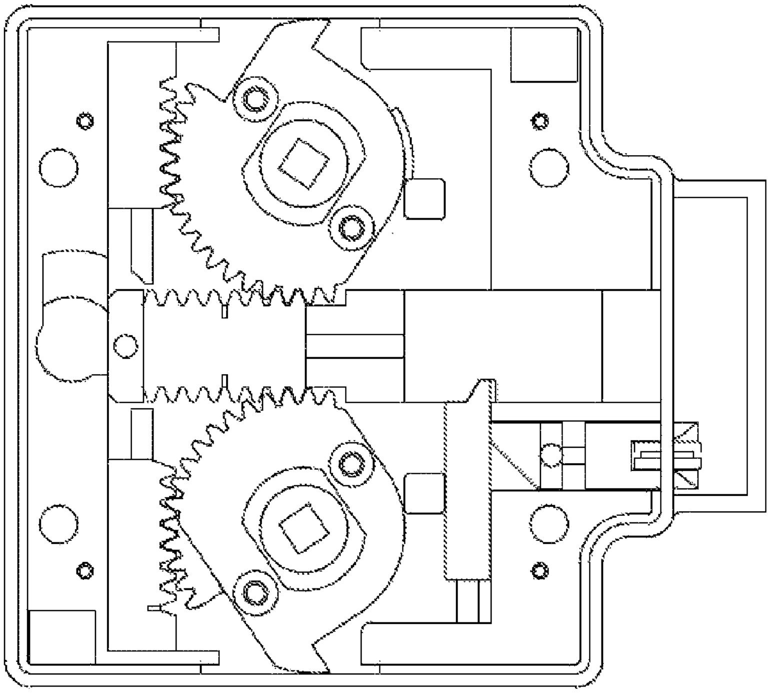
FIG. 8 is a plan view inside the bolt module showing internal components, with the bolt in the retracted position.
Figure 9:
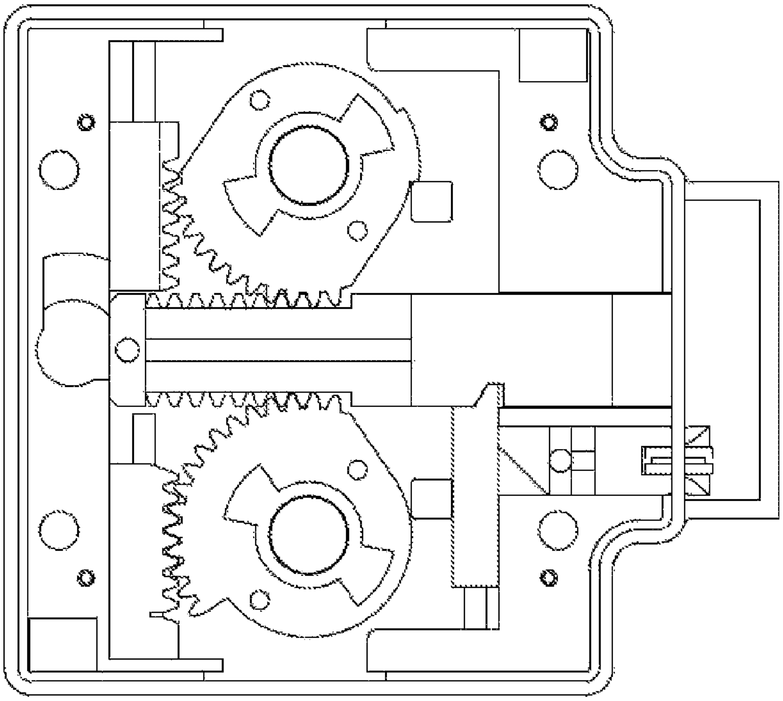
FIG. 9 is a plan view inside the bolt module showing internal components, with the bolt in the retracted position, and with outside rotors and slider removed.

FIGS. 8 and 9 show the bolt module with the bolt retracted. Similarly to FIG. 5, FIG. 9 has the outer rotors and sliders removed.

Firstly we consider a drive element inserted into the outside rotor 41 of the first rotor assembly 40. Turning the drive element and outside rotor in an anti-clockwise direction causes teeth of rotor meshing with teeth of outside slider 31 to move slider sideways, to the left as shown in FIGS. 3 and 8. This movement of the slider also causes outside rotor of the second rotor assembly to rotate because the teeth of the outside rotor of the second rotor assembly mesh with the outside slider 31. The direction of rotation of the outside rotor 51 of the second rotor assembly 50 is the opposite to that of the driven outside rotor 41 of the first rotor assembly. Turning of the outside rotor 41 moves the outside slider towards the shoulder part 31*c* of the bolt 31. Continued turning of the outside rotor 41 drives the slider further sideways pushing the outside slider 31 against the shoulder part 31*c* to retract the bolt inwards. Driving of the outside rotor 41 of the first rotor assembly 40 also drives the inside rotor of the first assembly because the lost motion applies when driven from the inside only. Hence, rotation of the outside rotor 41 takes up any slack between the inside and outside rotors of the first rotor assembly. Continued turning of the outside rotor turns the inside rotor. As shown in FIG. 5, the inside rotor 42 of the first rotor assembly 40 has teeth which mesh with inside slider 32. Thus, turning of the outside rotor 41 assembly drives inside slider 32, which also moves against a corresponding shoulder of the bolt and acts to retract the bolt upon continue driving. The movement of inside slider rotates inside rotor of second rotor assembly. The direction of rotation of the inside and outside rotors 41, 42 of the first rotor assemblies is the same, namely anti-clockwise to retract the bolt. This is the opposite direction to the direction of rotation of the inside and outside rotors 51, 52 of the second rotor assembly, which is clockwise. Although preferably both sliders contact the shoulder parts of the bolt at the same time and so would withdraw the bolt evenly from both sides, as a result of differences in manufacture one of the sliders will likely contact the shoulder part slightly before the other slider, so that retraction of the bolt is performed by one of the sliders rather than both. However, both sliders will still move as will all four rotors, but the actual part pressing against the bolt to retract it may be only one of the sliders. If this is the case, it is preferable that the inside slider 32 acts first and retracts the bolt.

As the outside rotor 41 of the first rotor assembly is turned the concomitant rotation of the inside rotor 42 of the first assembly moves the anti-thrust member 45 out of the path of the bolt. As can be seen in FIG. 5, the inside rotor of the first rotor assembly has teeth extending around ⅓ of the circumference of the gear, which is more than the first rotor which has teeth extending around only a quarter of the circumference. The increased number of teeth is for this engagement with the teeth of the anti-thrust member 45, whereas the reduced number of teeth of the outside rotor 41 of the first rotor assembly is so as to avoid contact with the anti-thrust member 45. Upon turning of the outside rotor 41 the teeth of the inside rotor 42, which are meshing with those of the anti-thrust member, rotate moving the anti-thrust member 45 downwards and out of the path of the bolt.

On turning of the inside rotor the bolt 30 and the anti-thrust member 45 are both moved from the start of turning. Hence, the length the anti-thrust member protrudes in the path of the bolt, and the size of any gap between the bolt and anti-thrust member, are sized such that the anti-thrust member has been moved from the immediate path of the bolt just before the bolt arrives there.

The anti-thrust member 45 and recess 31*b* of the bolt permit a small amount of inward movement of the bolt when acted on by an external force on the bolt. The large recess and the smaller recess in the bolt permit this movement without moving the sliders. Upon pushing the bolt the sliders are not moved but the shoulder part 31*c* of the bolt quickly hits the anti-thrust member 45. The decoupling of movement of the bolt and the sliders in this way, under action of external force, prevents the external driving force on the bolt from reverse driving the rotors and other parts of the mechanism of the bolt module.

After retraction of the bolt 30 and opening of the leaf or door, the drive element may be released. The spring means operating on the anti-thrust member 45 and bias member 46 act to throw the bolt. The anti-thrust member 45 has teeth meshing with the inside rotor 42 of the first rotor assembly 40. As the spring means pushes the anti-thrust member back into the path of the bolt, the inside rotor is rotated. Rotation of the inside rotor moves the inside slider 31. As mentioned above, the inside slider has only a small freedom of movement before it starts to act on the bolt. Hence, rotation of the inside rotor causes the slider to move and throw the bolt. Movement of the inside slider 31 also causes the inside rotor of the second rotor assembly to return to its starting position. The action of returning the inside rotor 42 to its starting position also returns the outside rotor to its starting position. The return action on the outside rotors is two-fold here. The inside rotor 42 will drive the outside rotor 41 because the lost-motion device and recess are operating to transfer motion directly between inside and outside here. A face of the bow-tie device will act against a face of the bow-tie recess to return the outside rotor 41 at the same time the inside rotor 42 returns to its starting position. In addition the bias member 46 will act on the outside rotor 51 of the second rotor assembly 50 to return the outside rotor 51 of the second rotor assembly to its starting position. Through the concomitant motion of the outside slider, the bias member also acts to return the outside rotor to its start position.

As mentioned above the bolt 30 may be driven by a drive element acting on any of the four rotors. We have above described the drive element acting on the outside rotor of the first rotor assembly 40. Driving of the bolt by a drive element acting on the outside rotor of the second rotor assembly 50 is similar because the motion of the two outside rotors is directly linked by outside slider. The main difference here is that the direction of rotation of the second rotor is opposite to that required by the first rotor, namely it is clockwise compared to anti-clockwise. The result of this is that the direction of rotation of the drive element can be selected. For example, it may be desirable that the direction of rotation for retracting the bolt is always away from the edge of the door. This requires the direction of rotation to be different for left hand and right hand opening doors. Thus, the person fitting the lock system or bolt module can select the first of second rotor assembly for receiving the drive element based on the desired direction of rotation of the drive element.

Driving of the bolt 30 using drive elements inserted into inside drive rotors differs slightly compared to outside driving in that the lost motion between the inside and outside drive element is such that the outside rotors are not moved when the inside rotors are driven. This is because the lost motion between the inside and outside rotors permits the outside rotors to be locked by locking modules while leaving the inside rotors free to move. Accordingly the outside slider is also not moved.

FIG. 5 shows the bolt module with the outside rotor removed. Hence, when considering driving by the inside rotors it is convenient to refer to this figure. Driving of the inside rotor of the first rotor assembly 40 using a drive element requires rotation of the outside rotor in a clockwise direction as viewed from the inside (anticlockwise as viewed from the outside in FIG. 5). Rotation of the first rotor simultaneously drives the anti-thrust member 45 and inside slider 32. As discussed above the rotation of the inside rotor 42 of the first rotor assembly begins by moving the anti-thrust member 45 such that as any freedom of movement between the slider and bolt is taken up and the bolt begins to be retracted, the anti-thrust member is moved out of the path of the bolt. Continued rotation of the inside rotor of the first rotor assembly 40 retracts the bolt, as shown in FIG. 9. Inside slider 32 transfers movement from the inside rotor 42 of the first rotor assembly 40 to the inside rotor 52 of the second rotor assembly such that as the inside rotor 42 is rotated clockwise, the inside rotor 52 of the second rotor assembly 50 rotates in the opposite direction. The outside rotors 41, 51 of the first and second rotor assemblies are not moved by the inside rotors when one of the inside rotors is the driven rotor. The outside rotors are maintained in position because bias member 46 is operating on the outside rotors to bias the outside rotors in the thrown position. As the bolt is retracted by the inside rotor, the outside slider is also not driven by the bolt because of the large recess 31*b* in the outside of the bolt. Hence, as the bolt is retracted the movement of the bolt does not drive the outside slider 31.

After the bolt has been retracted and the door opened, the bolt is returned back to the thrown position by action of the bias member 46 and the anti-thrust member 45. The bias member 46 acts on the outside rotors which are not moved when the bolt is driven by the inside rotors. The anti-thrust member 45 is biased by spring means which moves the anti-thrust member upwards. This rotates the inside rotor of the first rotor assembly in an anti-clockwise direction as viewed from the inside (clockwise as viewed in FIG. 5). This drives inside slider 32 to drive the bolt 30 outwards to secure the door. Movement of the inside slider 32 also drives the inside rotor of the second rotor assembly returning it to its thrown position. No movement of the outside slider occurs. Once back in the thrown position the anti-thrust member 45 has also moved upwards to block the path of the bolt from forced retraction.

For the bolt module, on the face of it there is some symmetry between inside rotors and outside rotors, and also between first rotor assembly and second rotor assembly. However, the different manner in which the sliders operate along with the lost-motion between inside and outside rotors gives various different operating modes and directions as discussed above.

The inside rotor 42 of the first rotor assembly 40 is operated on by the inside slider 32 and the anti-thrust member 45. The outside rotor 51 of the second rotor assembly 50 is operated on by the outside slider 31 and the bias member 46. Correspondingly both of these rotors 42, 51 have teeth extending around a larger part of the circumference of the rotor than the rotors 41 and 52, namely around approximately ⅓ of the circumference. Outside rotor 41 of the first rotor assembly 40 and inside rotor 52 of the second rotor assembly are operated on by the outside and inside sliders respectively. These rotors 41 and 52 have teeth extending around approximately only a quarter of the circumference of the rotor.

As can be seen in FIGS. 3 and 5 each of the four rotors may have a flat edge for support or butting against an internal structure within the housing. In particular, in FIG. 5 the right hand side of the inside rotors have a flat part that buts against an internal structure within the housing. In the case of the inside rotor 42 of the first rotor assembly, in the thrown position the flat side of the rotor butts against the internal structure and acts a stop to prevent further driving beyond the thrown position. As the rotor is turned the curved surface of the rotor is also guided by the internal structure. The inside rotor 52 of the second rotor assembly 50, and both outside rotors 41, 51 are also guided and stopped in a similar manner.

Figure 10:
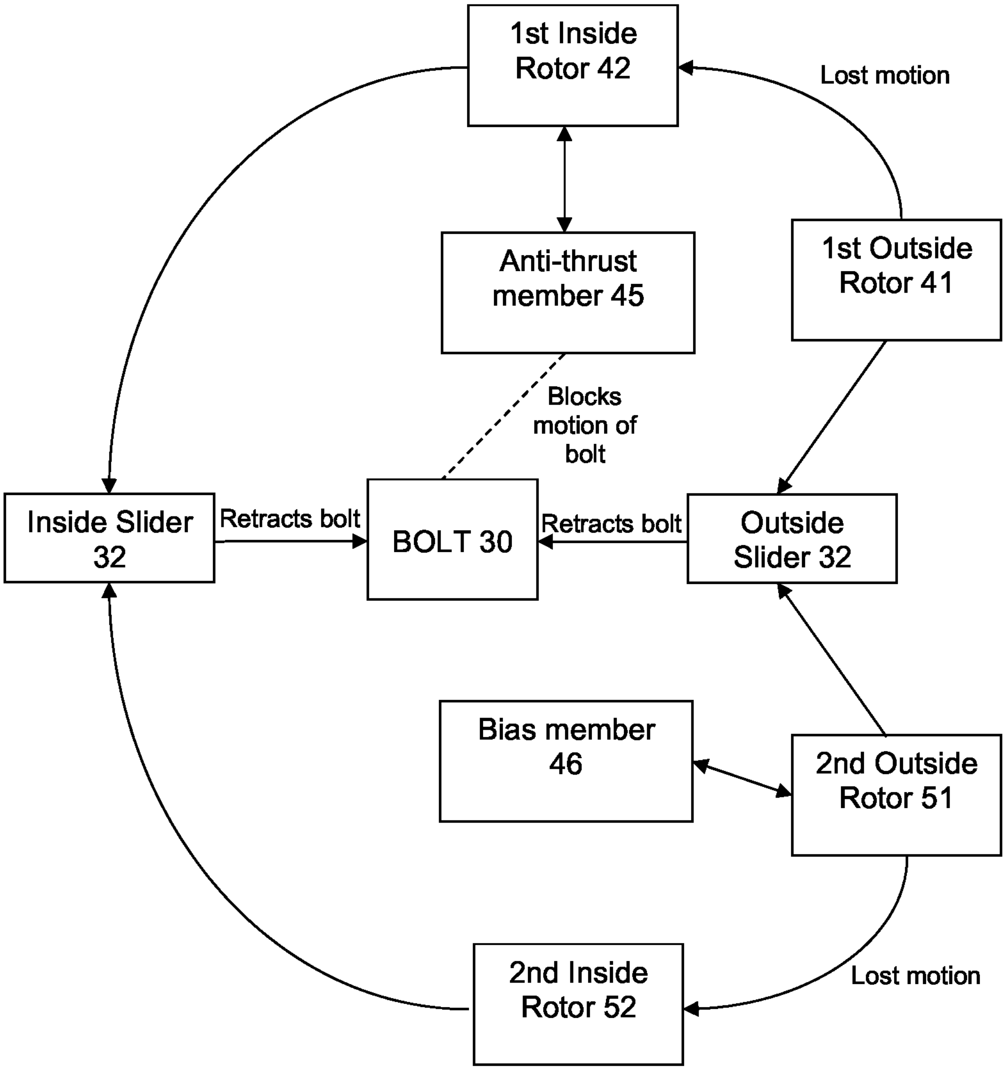
FIG. 10 is a flow chart summarising operation of the bolt module.

FIG. 10 is a flow chart summarising the action of the various components of the bolt module on each other. The direction of the arrows indicates the direction motion or drive is transferred between components. For example, the bolt may be retracted by action of the inside slider or outside slider. The outside rotors drive the inside rotors, but the inside rotors do not drive the outside rotors when driven by a drive element. The anti-thrust member and bias member provide return bias to the inside and outside rotors respectively. The dotted line shows the anti-thrust member blocks motion of the bolt.

As shown in FIGS. 3-6 the bolt module may also comprise a latch and trigger arrangement 35 for latching and releasing the bolt. The bolt 30 has a notch 30*a* cut into it for engagement by bolt restraint latch 36. Bolt restraint latch 36 is biased towards the bolt 30, preferably by a spring means similar to those biasing the anti-thrust member 45 and bias member 46 but other spring means may be used. The bolt restraint latch has an engagement portion at the end of the latch for engaging in the notch 30*a*. The notch and engagement portion are tapered such that as soon as the bolt is retracted far enough for the narrowest part of the engagement portion to be received by the notch, the bias of the restraint latch pushes the latch fully into the notch. By pushing the latch fully into the notch, the tapered portion also provides some force pushing the bolt back. Upon latching of the bolt, the bolt is held in the retracted position.

As shown in FIG. 5 the latch and trigger arrangement 35 also includes a trigger finger 35*a* for release of the bolt restraint latch 36. Where the trigger finger 35*a* sits against the restraint latch 36, the trigger finger has a latch pusher 35*b* and threaded rod 35*c*. The latch pusher and trigger finger have angled surfaces arranged in correspondence to each other and riding against each other. The angled part of the trigger finger is arranged such that horizontal movement of the trigger finger drives the bolt restraint latch upwards releasing the latch.

As discussed above, when the latch is retracted the bolt restraint latch 36 engages in the notch 30*a* in the bolt restraining the bolt. In this position the bolt restraint latch 36 has moved upwards pushing the trigger finger outwards from the housing adjacent or close to where the bolt extends and retracts from.

The latch pusher also comprises a guide pin 35*d* which moves with the latch pusher and is guided in a slot in cover of the bolt module which is removed in FIGS. 3-6.

The bolt restraint latch 36 and trigger finger 35*a* provide the advantage of restraining the bolt such that it does not catch or drag against the door jamb. The trigger finger provides release of the bolt such that the bolt is thrown into the keeper when the door or leaf is pushed closed.

As mentioned above in relation to FIGS. 1 and 2, the locking system may include the bolt module and locking modules. First and second locking modules operate on, or interact with, the outside rotors of the first and second rotor assemblies respectively. When either of the first or second locking modules is locked, the outside rotors cannot be turned and retraction of the bolt can only be performed from the inside.

Locking modules are provided to lock the bolt module and prevent actuation from the outside. Examples of such locking modules include a combination such as shown in FIG. 2 for one of the locking modules. The second locking module may be a swipe card based, such as shown in FIG. 2, or keypad based electronic lock. In other embodiments the first and second locking modules may be different types of lock. GB 2520666 provides examples of locking modules.

Figure 11:
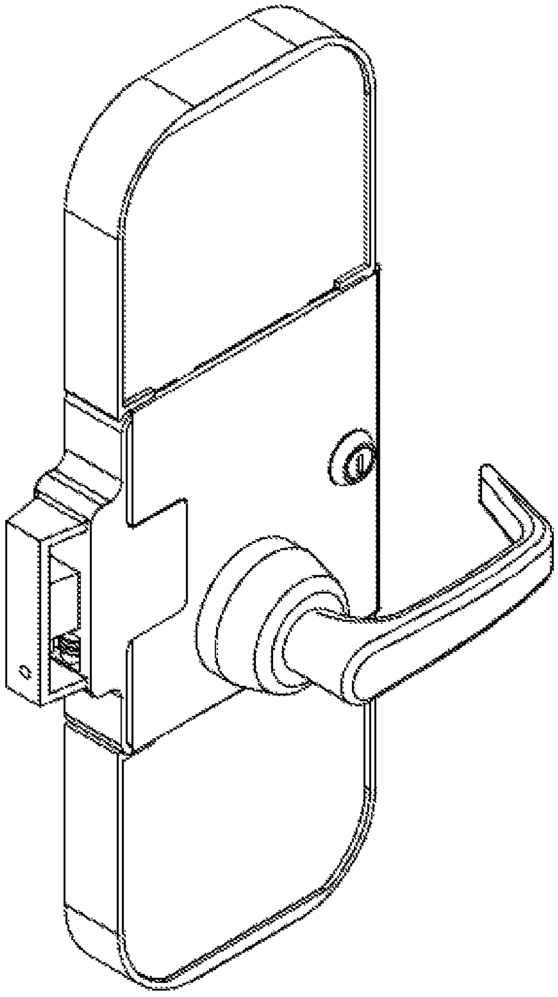
FIG. 11 is perspective view of the lock system including bolt module and first and second locking modules.

FIG. 11 shows lock system with a handle acting as a drive element. In this configuration the handle operates to drive the lower of the inside rotors for retracting the bolt. First and second locking modules are also shown. The bolt module and locking modules are arranged for mounting on the inside of a door leaf. The outside of the door comprises connections through to the modules.

Figure 12:
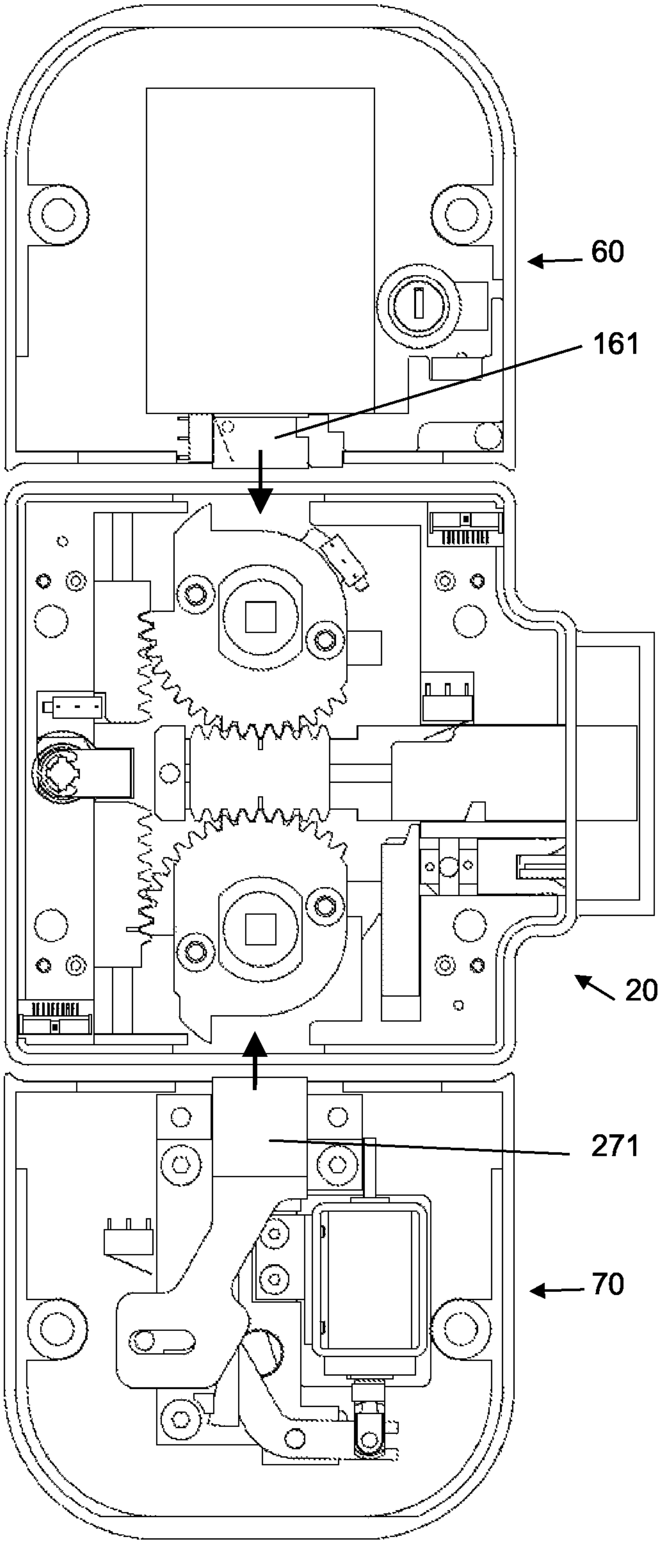
FIG. 12 is a plan view inside the lock system comprising bolt module, first locking module and second locking module.

FIG. 12 is a plan view showing the inside of the bolt module 20 along with examples of the first locking module 60 and second locking module 70. The inside view is arrived at by removing a part of the housing or cover of the modules shown in FIG. 11. The three modules are approximately arranged in the configuration they would be in use, such as in FIG. 11. For clarity a small gap has been left between the modules so that where one module ends and the other begins can be seen. In practice the modules would be in contact. The figure shows where locking members 161, 271 of the two locking modules move (indicated by the arrows) to the thrown positions, through the apertures in the bolt module and to block movement of the outside rotors by stopping movement of the stopping shoulder on, for example, the outside rotor.

Figure 13:
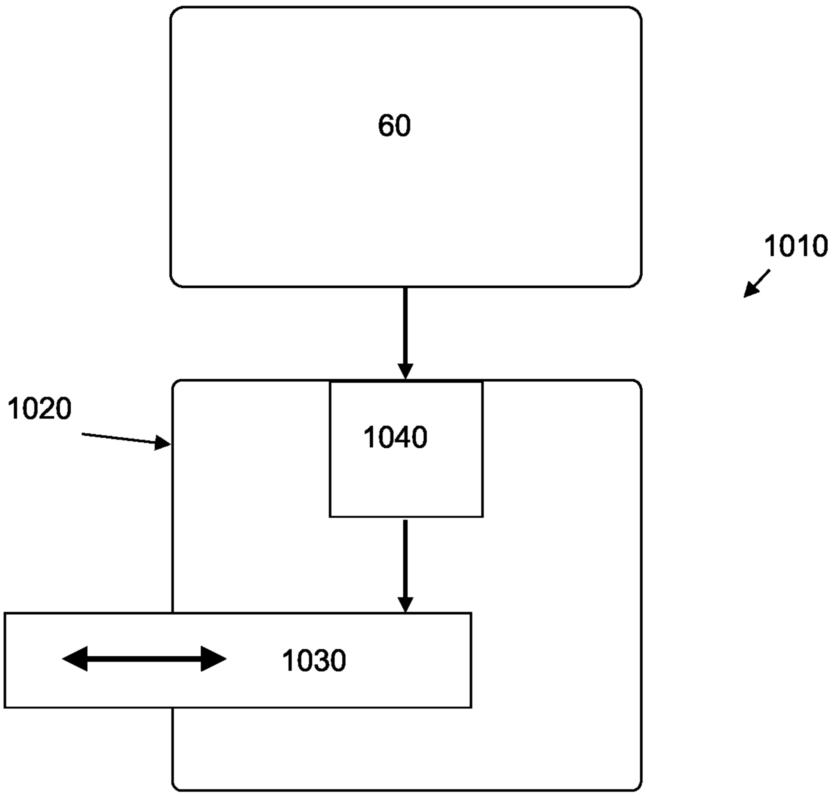
FIG. 13 is a schematic diagram of a single-sided lock system.
Figure 14:
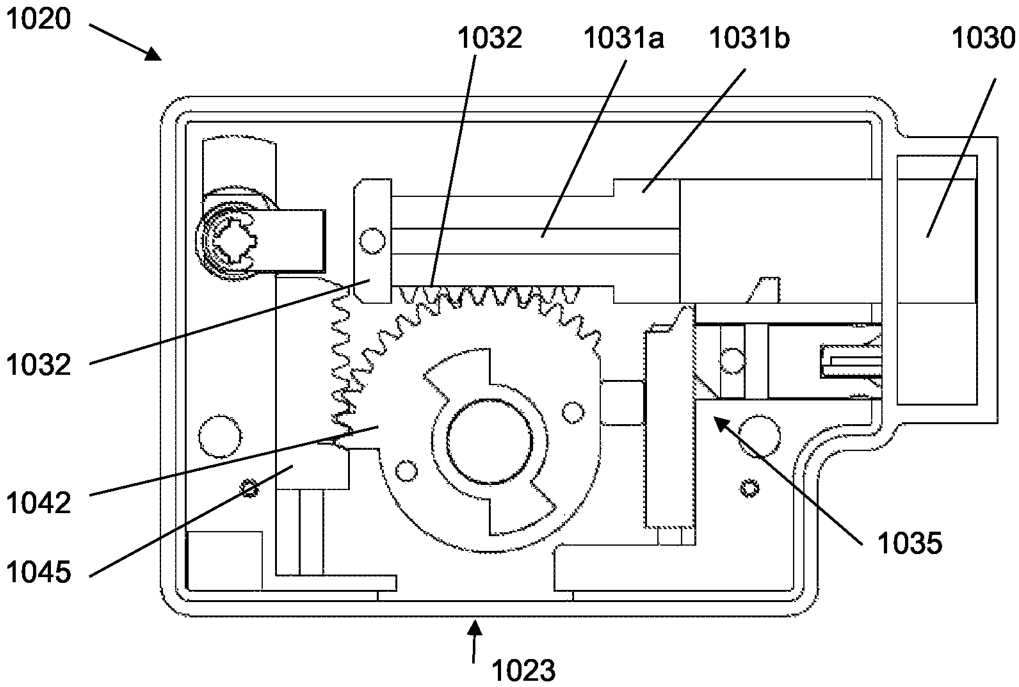
FIG. 14 is a plan view inside the single-sided bolt module showing internal components, with the bolt in the thrown position, and outside rotor and outside slider removed.
Figure 15:
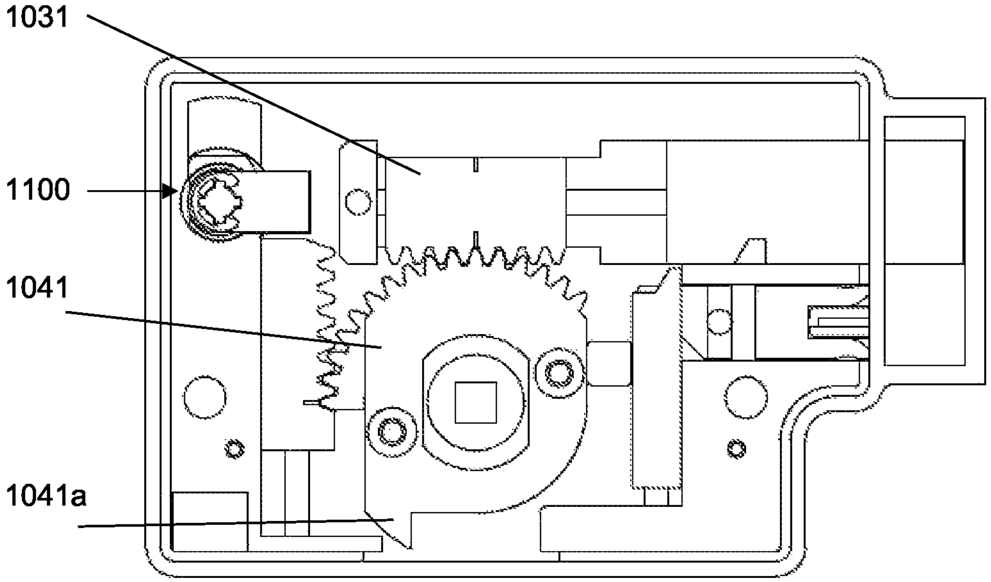
FIG. 15 is a plan view inside the single-sided bolt module showing internal components, with the bolt in the thrown position, with outside rotor and outside slider present.

FIGS. 13-15 show a single sided bolt module which includes some of the functionality of bolt module 20, but is not adapted to be able to select direction of rotation of driving.

FIG. 13 is a schematic diagram showing single sided lock system 1010 comprising single sided bolt module 1020 and a locking module, for example first locking module 60. The bolt module 1020 comprises a bolt 1030 movable between thrown and retracted positions and driven by rotor assembly 1040. The rotor assembly may be at least partly locked by locking module 60. The locking by locking module operates on an outside rotor to prevent access from the outside when the locking module is locked. Exit from the inside may always be possible due to independent drive of the bolt from the inside.

FIG. 14 shows the single sided bolt module with outside rotor and outside slider removed, whereas they are present in FIG. 15. The single sided module is also for use with only a single locking module. This single sided module might be considered a more conventional locking device and an alternative to the device in GB 2289084.

Single sided bolt module 1020 comprises components similar to module 20. The bolt module 1020 comprises a bolt 1030 for driving between thrown and retracted positions. The bolt is driven by rotor assembly which comprises an inside rotor 1041 and outside rotor 1042. The bolt comprises recess 1031*b* in the bolt in which outside slider 1031 is arranged. Movement of the outside slider is guided by guide 1031*a*. On the opposite side of the bolt is a further recess in which inside slider 1032 seats. The inside slider is also guided by a corresponding guide. The inside rotor 1042 and outside rotor 1041 rotate on the same axis with lost motion between them. The outside rotor 1041 is adapted to receive a drive element in an aperture in the centre of the rotor. The drive element is for rotating the rotor to retract the bolt. Outside rotor is also arranged to receive a drive element. On turning outside drive element anti-clockwise, outside rotor 1041 is rotated anticlockwise. This rotation drives outside slider in a direction for retracting the bolt (to the left in FIG. 14). The slider moves sideways and abuts the shoulder part 1031*c* of the bolt. Continued driving of the outside rotor 1041 pushes the outside slider against the shoulder part 1031*c* retracting the bolt 1030. When driven by the outside rotor 1041, the inside rotor is also driven. Hence, inside rotor 1042 drives inside slider, which also abuts against a corresponding shoulder part. The bolt is therefore retracted by the action of sliders on both sides of the bolt. If the sliders and bolts are not identical it is possible one of the sliders will abut against shoulder part of the bolt before the other. In such a case either one of the sliders will retract the bolt.

When rotor assembly is driven from the inside, the inside rotor is rotated in the clockwise direction when viewed from the inside (anti-clockwise when viewed as in FIG. 14). The lost motion between the inside rotor and outside rotor means that the outside rotor is not acted on by the inside rotor. The outside rotor 1041 may therefore not move when the inside rotor is turned. When the inside rotor 1042 is turned the inside slider 1032 drives against the shoulder part of bolt 1031*c* thereby retracting the bolt.

The bolt 1030 has a larger recess on the outside side of the bolt, as for the bolt 30 in FIG. 7. The larger recess 1031*b* in FIG. 29 permits the bolt to be retracted without moving the outside slider 1031.

Anti-thrust member 1045 acts to block the path of the bolt 1030 if an external force is applied on the exposed end of the bolt. This operates analogously to the anti-thrust member 45 in FIGS. 3-6, namely the anti-thrust member is moved out of the path of the bolt if either rotor is driven to retract the bolt. The lost-motion between outside and inside rotors is provided in a corresponding manner to FIGS. 3-6. The anti-thrust member 45 also provides bias to inside rotor. This bias biases the inside rotor to throw the bolt. When outside rotor is turned to drive the bolt, the bias will also bias the outside rotor to move it back to the thrown position. Differently to the bolt module of FIGS. 3-6, no bias is directly provided to the outside rotor. Hence, when the inside rotor is turned the outside rotor may also turn due to friction between the rotors. However, it is expected any drive element on the outside will maintain the outside rotor in position. If separate direct bias to the outside rotor is required a bias member could be provided analogously to the anti-thrust member. This would also require additional teeth on the outside rotor if the bias member is provided above the anti-thrust member.

In the same way as for bolt module 20 of FIGS. 3-6 the outside rotor 1042 includes stopping shoulder 1041*a*. As discussed above, the stopping shoulder is one way of arranging the outside rotor to be locked by a locking module, such as may have a locking element for driving into aperture 1023.

As discussed above, inside driving is possible whether or not the locking module acts to lock the part of the rotor assembly, namely the outside rotor. Outside driving is possible only when the locking module is not locked. When locked, rotation of the outside rotor is blocked. The locking module 1060 may be any of the locking modules described above. For example, it may include a combination lock, mechanical key lock, access control unit etc. A preferred embodiment for use on an emergency exit may include a mechanical key for locking from the outside of the door. A handle may be provided on the outside for driving outside rotor. Inside a push pad, panic bar, or touch bar may be provided for egress independent of whether the locking module is locked.

The single sided module can be used on left hand opening and right hand opening doors by inverting the module but the direction of rotation of drive elements cannot be selected. Furthermore, the locking module cannot always be located above the bolt module, because inversion of the bolt module will mean the locking module will also be inverted.

Nevertheless, the lock system is simpler and more compact compared to the lock system 20.

In an even simpler variation of the single sided bolt module the rotor assembly may comprise a single rotor and there may be a single slider. In such an arrangement the drive means such as a handle would provide the same operation on inside and outside of the door. In such a case if a handle was only provided on one side then the door could not be opened from the other side. The locking module be required since there would be no access from the outside. The anti-thrust member and bolt restrain would still be desired for the reasons discussed in the preceding paragraphs.

Figure 16:
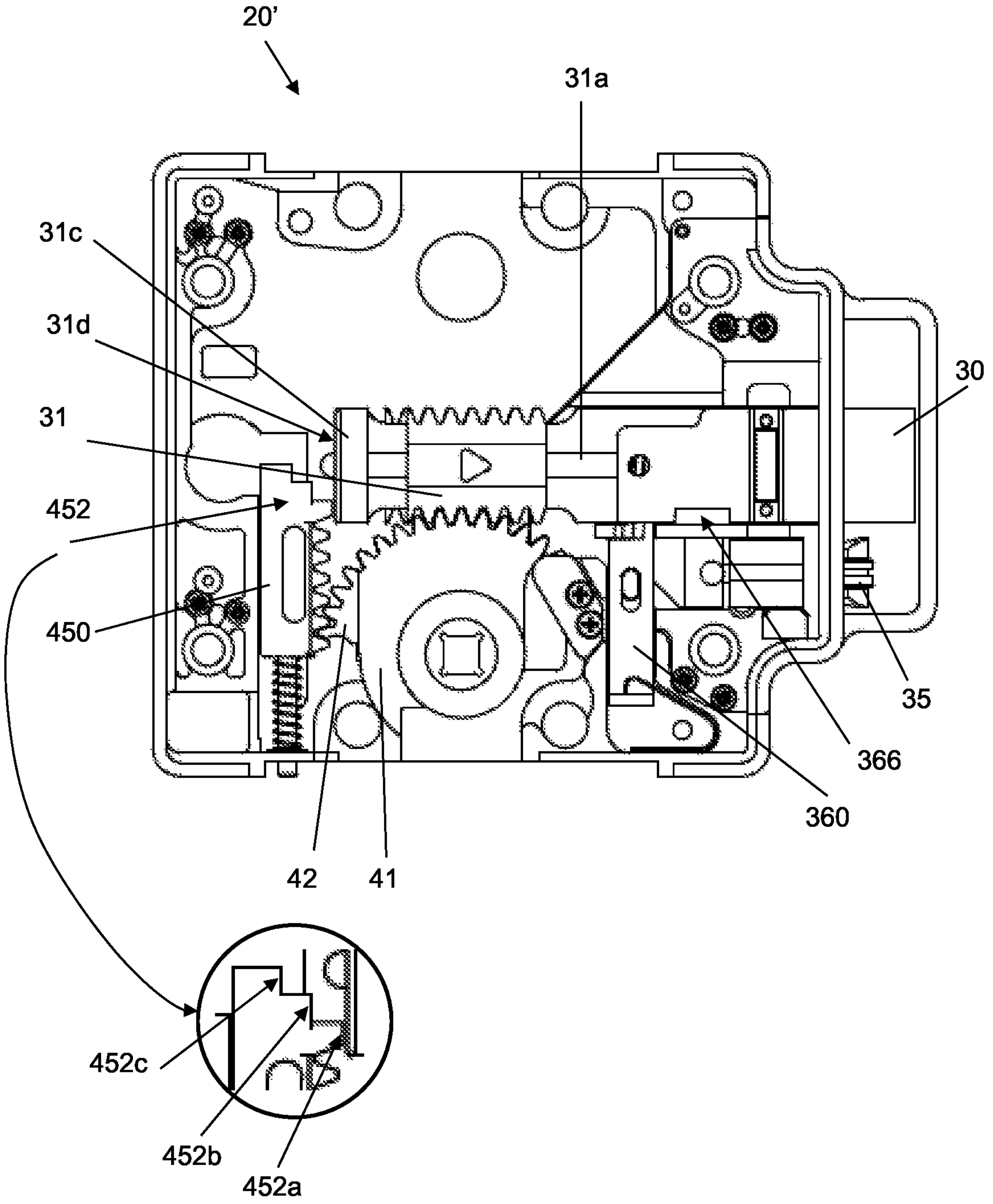
FIG. 16 is a plan view of the bolt module with modified anti-thrust and bolt restraint mechanisms according to the present invention.

FIG. 16 shows a modified bolt module 20' according to an embodiment of the present invention. The figure shows a number of components that are substantially the same as shown in FIGS. 3-9. These components are indicated by the same reference numbers. FIG. 16 omits the second (upper) rotor assembly for clarity but for a reversible unit this would need to be included. If a non-reversible unit is being provided, such as that of FIGS. 14 and 15, then the second rotor assembly may be omitted and the upper portion of the housing may be reduced in size.

Operation of the bolt module 20' is similar to that of the bolt module of FIGS. 3-9. Bolt module 20' includes a modified anti-thrust member 450 compared to the anti-thrust member 45 of FIGS. 3-9, and also include a modified restraint latch arrangement 360 compared restraint latch 36 of FIGS. 3-9. Although the embodiment of FIG. 16 shows the modified anti-thrust member 450 and restraint latch 360, in other embodiments one or other of the anti-thrust member or restraint latch may be included, although the two together provide additional advantages.

Before describing the modified features of bolt module 20', we briefly recap regarding the operation of the bolt module 20' based on that of bolt module 20. The bolt module 20' includes first rotor assembly which may comprise an inside rotor 42 and an outside rotor 41. In FIG. 16, the inside rotor 42 is largely hidden behind the outside rotor 41. The two rotors rotate on a common axis but are not joined together. The rotors may receive a drive spindle for turning of the rotor by a handle such as inside or outside drive. The rotors have lost motion between them such that the inner rotor may be turned without turning the outside rotor, but turning of the outside rotor drives rotation of the inside rotor. Bolt module 20' includes bolt 30 which extends from the bolt module when thrown to secure, for example, a door or leaf within a frame. The bolt includes slider 31 disposed in a recess in the bolt and guided by guide 31 which may be ride on the bolt. The slider shown in FIG. 16 may be an outside slider, and there may also be an inside slider disposed on the underside of the bolt as shown in the figure. As the outside rotor is turned, the outside slider moves along the bolt until it hits the shoulder 31*d* of the bolt. Continued turning of the outside rotor will cause the slider to push against the shoulder and retract the bolt. In embodiments with the inside slider, the inside slider may hit the bolt shoulder 31*d* first and cause retraction of the bolt, or they may both cause retraction of the bolt together.

It has been found that if the door is closed such that the bolt is thrown in to the keeper for some reason the bolt has not been fully thrown, the bolt may be pushed back into the module to gain unwanted access to the premises. Reasons for the bolt not being fully thrown include a blockage in the keeper preventing the bolt from fully extending or the bolt restraint mechanism not fully releasing the bolt. In these cases pulling on a door handle of the door show the door to be secured. However, because the bolt is not fully thrown the rotors and anti-thrust member have not fully returned to the expected positions when the bolt is thrown. This means that the anti-thrust member does not block driving back of the bolt and it is possible to drive back the bolt and gain unauthorised entry. Additionally, in some circumstances poor installation of the bolt module with respect to the keeper on the door frame may provide too much clearance such that with only a small amount of pushing back on the bolt the bolt clears the keeper and unauthorised entry can be gained.

In the embodiment of FIG. 16 a modified anti-thrust member 450 is provided to block driving back of the bolt by an external force on the protruding end of the bolt. Modified anti-thrust member 450 includes steps 452 which form multiple stopping faces which may variously be in the path of the bolt. As shown in FIG. 16 the bolt back face 31*d*, which is the end of the bolt opposite to the end that protrudes from the bolt module when thrown, is abutting against a part of the anti-thrust member. This part of the anti-thrust member may be a first stopping face. The steps of the anti-thrust member provide the multiple stopping faces with each being further back permitting greater retraction of the bolt. The first stopping face may be considered to prevent or limit pushing in of the bolt from a fully thrown position, whereas each of the other stopping faces may prevent or limit further pushing in of the bolt from partially retracted positions. As a minimum the antithrust member may comprise two stopping faces. In the inset of FIG. 16 an enlarged view of the steps of the anti-thrust member is shown. This shows three stopping faces 452*a*, 452*b* and 452*c*. The stopping faces are provided at one end of the anti-thrust member. The other end may be biased, for example by a coiled spring to urge the anti-thrust member in to the path of the bolt. Retraction of the antithrust member out of the way of the bolt is provided by rotation of the rotor assembly as we will now describe.

Figure 17:
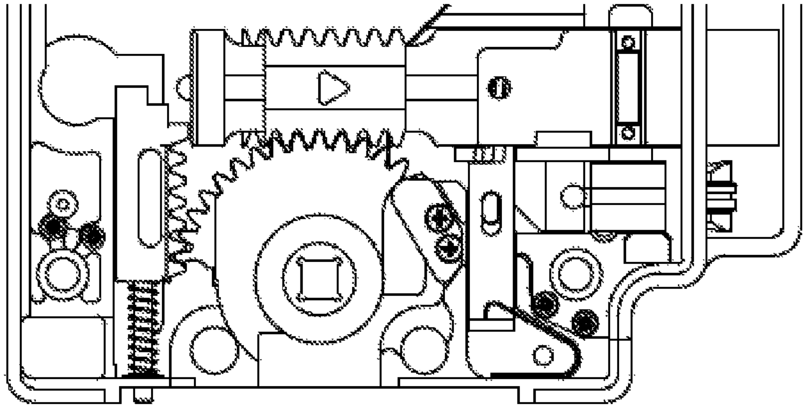
FIG. 17 is a plan view of the bolt module of FIG. 16 with the bolt in the thrown position and the bolt restraint blocking pushing back of the bolt.

Operation of the anti-thrust member of the bolt module 20' is as follows and is shown in FIGS. 17-22. FIGS. 17-22 do not show the second (upper) rotor assembly for clarity and as explained in relation to FIG. 16. In FIG. 17 the bolt, rotors and anti-thrust member are in the same position as in FIG. 16, namely with the bolt substantially in the thrown position. The anti-thrust member is in position to block driving back of the bolt.

Figure 18:
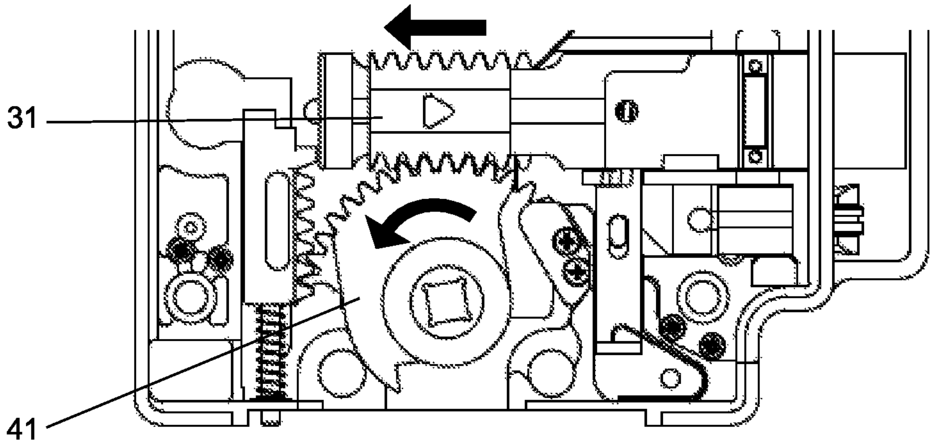
FIG. 18 is a plan view of the bolt module of FIG. 16 with the bolt in the thrown position, the anti-thrust member blocking pushing back of the bolt and the first rotor assembly rotated a first amount.

In FIG. 18 the outside rotor 41 is shown as having been turned a small amount anti-clockwise. This has moved the outside slider a small amount to the left such that it is closer to the shoulder 31*d* of the bolt, but no retraction of the bolt or retraction of the anti-thrust member has yet taken place. The outside rotor has also moved with lost-motion with respect to the inside rotor such that the inside rotor has not yet rotated.

Figure 19:
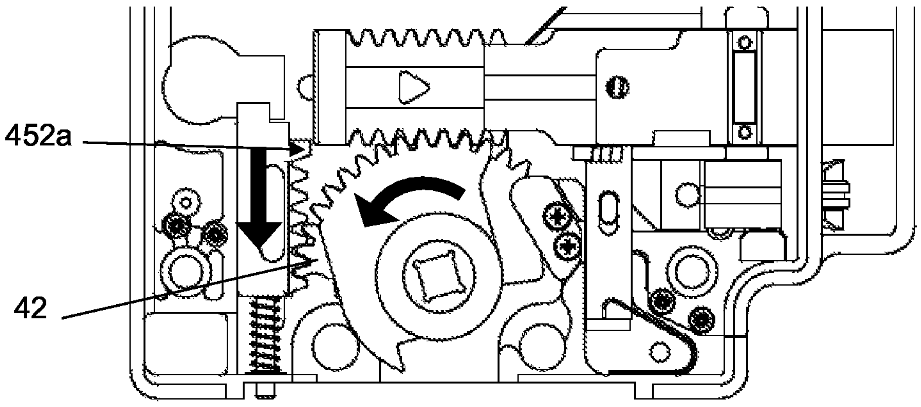
FIG. 19 is a plan view of the bolt module of FIG. 16 with the bolt in the thrown position, the first rotor assembly rotated a second amount and the first blocking face of the anti-thrust member moved clear of the back of the bolt.

In FIG. 19 the lost-motion between the outside rotor 41 and inside rotor 42 has been taken up and the further rotation of the outside rotor has also rotated the inside rotor 42. The teeth of the inside rotor are meshed with the rack on the anti-thrust member. The rotation of the inside rotor 42 has moved the anti-thrust member a small amount such that the first stopping face 452*a* is no longer in the path of the bolt. In FIG. 19 this is shown as a downward movement of the anti-thrust member.

Figure 19A:
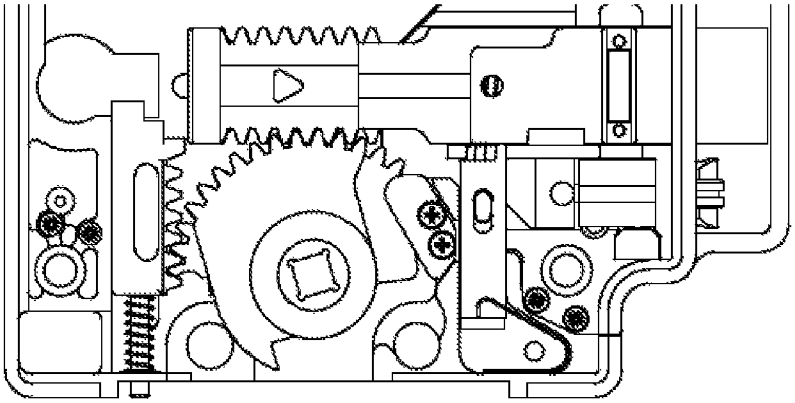
FIG. 19*a* is the same as FIG. 19 but shown on a different page.

FIG. 19*a* shows the same figure as FIG. 19 but is shown on the next page of the drawings for ease of comparison with the next steps of movement that we will now describe.

Figure 20:
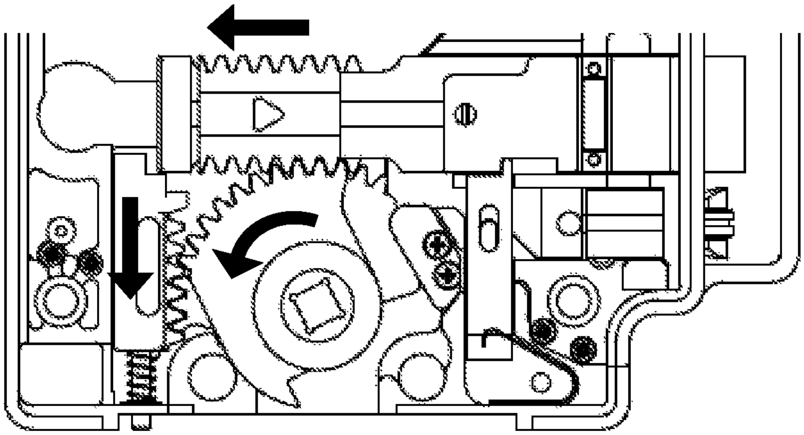
FIG. 20 is a plan view of the bolt module of FIG. 16 with the bolt in a first partially retracted position, the first rotor assembly rotated a third amount and the second blocking face of the anti-thrust member blocking pushing back of the bolt.
Figure 21:
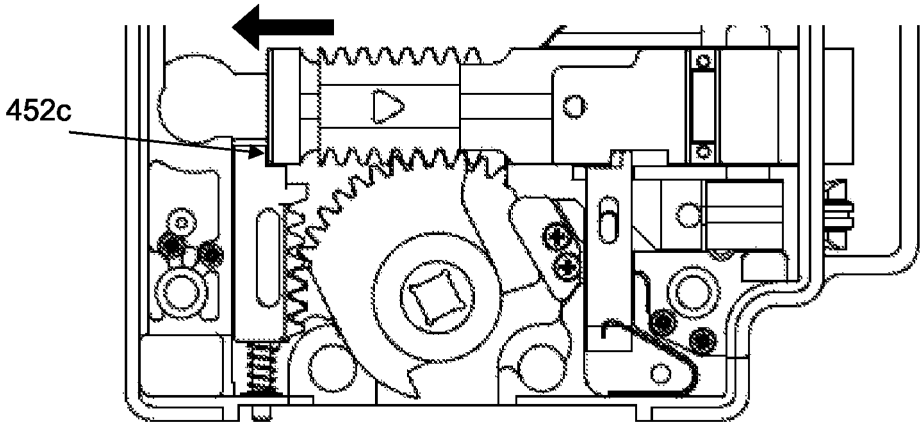
FIG. 21 is a plan view of the bolt module of FIG. 16 with the first rotor assembly and anti-thrust member in the same position as shown in FIG. 20 but with the bolt pushed pack against the second blocking face of the anti-thrust member.

FIG. 20 show that the rotors have been rotated further thereby retracting the bolt further and moving the anti-thrust member further out of the path of the bolt. The anti-thrust member has moved such that the first and second stopping faces 452*a* and 452*b* are now out of the path of the bolt. Only the third stopping face remains in the path of the bolt and the bolt 30 is partially retracted. In FIG. 21 a force has been applied to the end of the bolt that protrudes from the module and the bolt has been pushed back slightly. However, the stopping face 452*c* is in the way of the back face of the bolt and has blocked further pushing in of the bolt. In FIG. 21 it is shown that the bottom corner of the bolt is received in a step of the anti-thrust member with the third stopping face 452*c* abutting the bottom portion of the back face of the bolt 30.

Figure 21A:
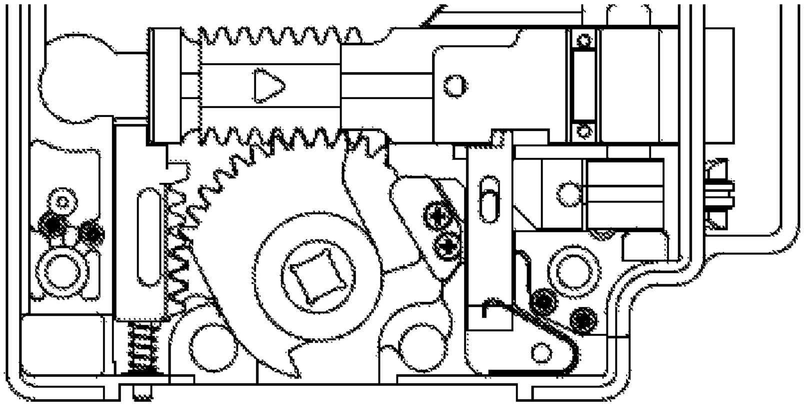
FIG. 21*a* is the same as FIG. 21 but shown on a different page.

FIG. 21*a* shows the same figure as FIG. 21 but is shown on the next page of the drawings for ease of comparison with the final step of movement that we will now describe.

Figure 22:
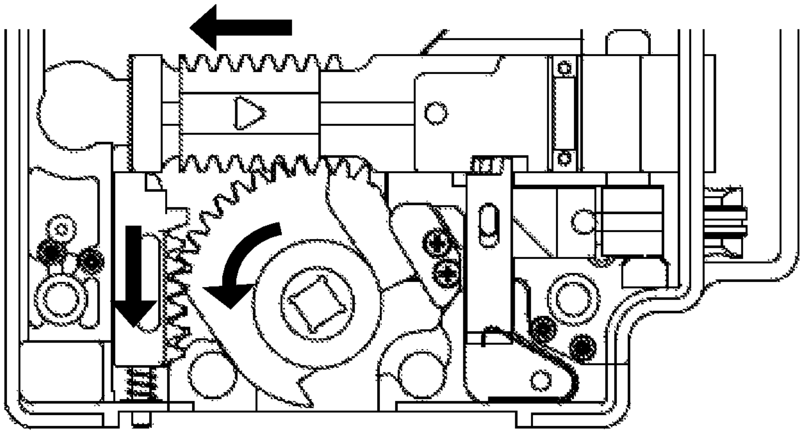
FIG. 22 is a plan view of the bolt module of FIG. 16 with the bolt in the retracted position, the anti-thrust member move clear of the path of the bolt and the first rotor assembly rotated a fourth amount.

In FIG. 22 the rotors have been rotated further thereby withdrawing the anti-thrust member 450 completely out of the path of the bolt. The bolt has also been moved to the fully retracted position.

Hence, through FIGS. 17-22 it can be seen that even if the bolt is not fully thrown and the rotors have not been fully returned to the thrown position, pushing back on the bolt is blocked by the additional stopping faces of the modified anti-thrust member 450.

Operation of the bolt module is similar when driven by the inside rotor except that the outside rotor and outside slider do not move. The inside rotor acts on inside slider to retract the bolt the anti-thrust member directly. Lost motion between the inside and outside rotor means that the outside rotor does not move. Correspondingly, the outside slider also does not need to move.

FIG. 16 also shows modified restraint latch 360 along with the trigger 35. This is shown in more detail in FIGS. 23 and 24. FIG. 24 is a perspective view of the restraint latch 360 and trigger 35 shown without the rest of the bolt module. FIG. 24 is an exploded view of the same components.

Figure 23:
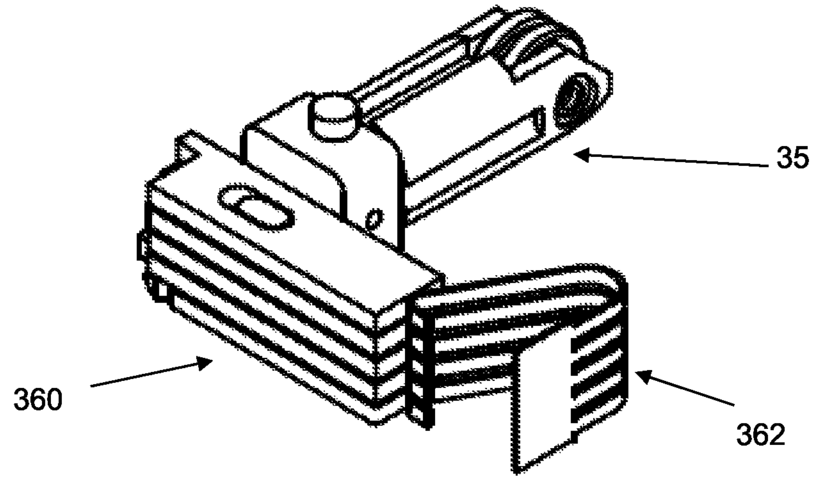
FIG. 23 is a perspective view of the trigger and modified bolt restraint mechanism according to the present invention.
Figure 24:
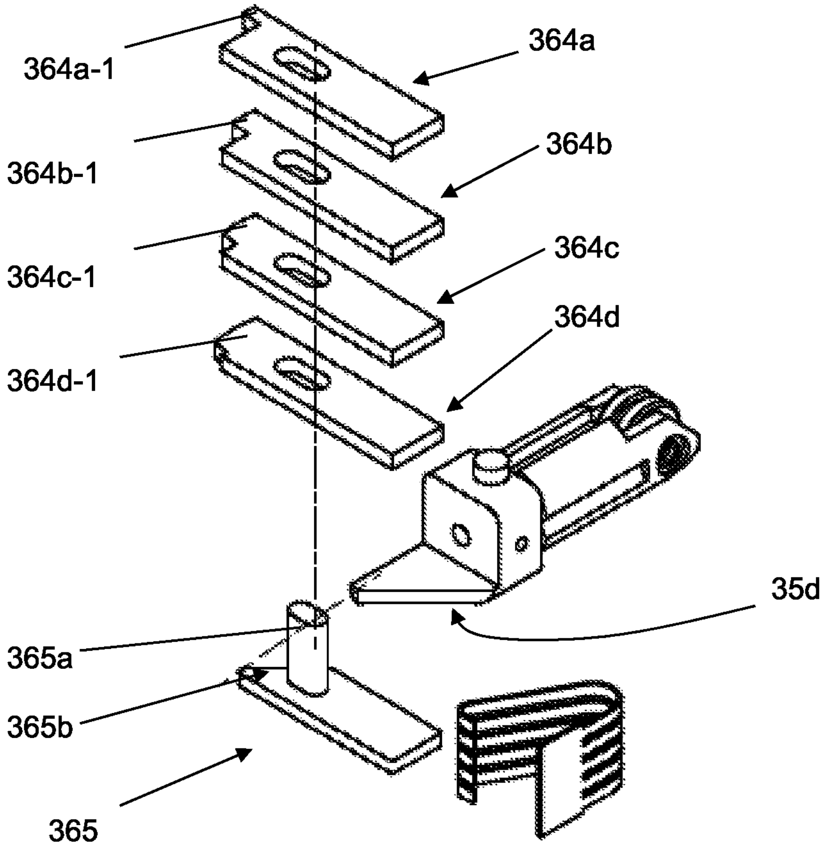
FIG. 24 is a perspective exploded view of the modified bolt restraint mechanism according to the present invention.

FIGS. 23 and 24 show the restraint latch 360 comprises multiple fingers 364*a*-364*d*. In the embodiment shown four fingers are provided but other numbers of fingers may be provided. The fingers are shown as plates with an elongate aperture or slot therein. The fingers are substantially the same shape as each other expect for a tab at the end of the finger, which will be described further in the following. There is also provided a restraint latch reset plate 365 which includes a pin 365*a*. The pin 365*a* is shown as having an elongated cross-section but other cross-sections are possible. The pin is disposed in the slots or apertures of the fingers which are aligned parallel.

The reset plate also has a surface 365*b* that is acted on by a surface 35*d* of the trigger 35. The trigger 35 is largely similar to the trigger described previously in relation to FIGS. 3-9 with surface 35*d* corresponding to the angled surface described earlier. The surface 365*b* of the reset plate corresponds to the angled surface of the restraint latch. Referring to FIG. 16, in operation pushing in of the trigger 35 inwards moves the angled surface 35*d* against the angled surface 365*b* of the reset plate. The horizontal movement of the trigger pushing the reset plate in a downward direction. Returning to FIGS. 23 and 24 there is also shown comb spring 362. This comprises a series of lever springs formed as comb in one unit. Each lever of the spring acts against one of the reset plates and restraint fingers biasing them towards the bolt. Separate springs may alternatively be used but a comb spring is more convenient because of the small dimensions required and more difficulty mounting arrangements for separate springs. The levers act on the bottom surface of the finger, although other arrangements are possible.

The fingers 364*a-d* have tabs 364*a*-1 to 364*d*-1 of differing sizes. Referring to FIG. 16 the bolt includes notch 366 which is a recess in the width of the bolt. Each end of the notch is formed by a shoulder between the recessed width and the full width of the bolt. In other embodiments the recess may be formed of a region of narrower width of the bolt that is ended by a shoulder at the part of the recess closest to the slider and in the other direction the narrowed width extends to the protruding end of the bolt. Nevertheless, it is preferred that a notch is used as this will more likely prevent tampering.

The recess is sized such that the tabs of differing sizes are all able to be disposed in the recess. Each of the tabs includes an angled edge to guide the tab into the recess. By angled we mean that the edge is not a simple 90° to the direction of bolt movement, but is tapered or chamfered. The edge of the recess may also have a corresponding angled portion, such as at the same angle. The tabs are of differing sizes and in the embodiment shown in the figure the increase in size is stepwise by equal amounts moving from the smallest tab 364$a$-1 to the largest 364$d$-1.

We now describe operation of the restraint fingers by reference to FIGS. 17-22. There is some synergy between the anti-thrust member and the operation of the restraint fingers as we shall now describe.

As described, in FIG. 17 the bolt is in the fully thrown position, extending from the bolt module such as into a keeper or retainer for securing the door or leaf. In this position none of the fingers of the restraint latch are in the recess of the bolt but are urged against the regular side of the bolt and do not stop or restrain movement of the bolt. The trigger is extended from the bolt module. This remain the case until the bolt has started to be retracted as shown in FIG. 20. In FIG. 20 the bolt has been retracted sufficiently that the recess is retracted back towards the tabs of the fingers. In FIG. 20 only a small portion of the recess is in line with the fingers. This portion is large enough to accommodate the smallest tab 364$a$-1. Hence, the tab 364$a$-1 is urged by the spring 362 into the recess. Although the bolt is generally biased towards the thrown position, the restraint fingers will restrain the bolt in a partially thrown position to prevent it from being fully thrown. In FIG. 20 the bolt has been partially retracted and the tab of the first finger prevent the bolt from being fully thrown again by sliding into recess 366.

As described, the tabs each have an angled edge. Hence, when the bolt is partially retracted sufficient for the end of the tab to enter the recess, the bias on the finger will urge the tab further into the recess and the angle on the edge of the tab will retract the bolt a small amount further. To aid this the shoulder of the recess also has a corresponding angled edge. This also encourages smooth operation of the restraint finger and helps them to slide gently into the recess rather than to drop in suddenly.

With the first tab in the recess, in the embodiment shown the path of the back face of the bolt is obstructed by the third stopping face 452$c$ of the anti-thrust member 450. Although as can be seen in FIG. 20 there remains a small amount of movement of the bolt before it hits and is stopped by the third stopping face 452$c$.

In FIG. 21 a force has been applied to the bolt to push the bolt inwards in to the module. The bolt has moved a small amount such that the back face of the bolt abuts against the third stopping face of the anti-thrust member. In this position of the bolt, the amount of recess 366 in line with the fingers is slightly larger. Hence, the second finger of the restraint mechanism has moved such the tab of the second finger is disposed in the recess. Between the anti-thrust member and the restraint mechanism the bolt is almost completely restrained preventing movement of the bolt in either direction.

In FIG. 22 the bolt has been fully retracted. Here all four of the fingers have moved such that the tabs of the fingers are disposed in the recess restraining the bolt in the fully retracted position.

The deployment of the fingers at different bolt retraction positions is caused by the different widths of the tabs of the fingers, such that the finger with the smallest tab deploys first and increasing width tabs are successively deployed into the recess. It is possible in alternative arrangements that the tabs be of equal width but are differently positioned. In both cases the relative positions of the leading edges of the tabs in relation to the shoulder of the recess sets when each finger is deployed into the recess. In the embodiment shown in the figures the tabs have increasing width for increased robustness as compared to narrow differently positioned tabs.

The tabs of the fingers are arranged such that the leading edges of the tabs are spaced apart for consecutive deployment. This consecutive deployment operates similar to a ratchet arrangement in which increasing retraction of the bolt is successively restrained.

To release the bolt, the trigger 35 is required to be pressed. This may be achieved when the leaf or door is being closed. As the door approaches being closed the trigger will push against the door frame depressing the trigger into the bolt module. On further closing of the door, the bolt and trigger will be received in the receiver or keeper, releasing the trigger from being depressed. The point at which the door is almost closed and the trigger is depressed means that the angled surface 35$d$ of the trigger pushes against the angled surface 365$b$ of the reset plate. Based on the arrangement shown in figure, the pushing of the trigger to the left will cause the reset plate 365 of the restraint mechanism to be pushed downwards. As the reset plate moves downwards the pin of the reset plate will drag each of the fingers out the recess of the bolt. This is also the downward direction in FIG. 16. With the fingers released from the recess the bolt, which is biased, will move to the thrown position under this bias. The rotors of the module will also correspondingly rotate.

Although we have described the bolt restraint fingers in relation to various different positions of the anti-thrust member, in an alternative embodiment the fingers may be provided without the anti-thrust member. In such a case the fingers will provide a ratcheted restraint mechanism. However, the combination of the bolt restraint finger with the anti-thrust mechanism provides greatest control on unwanted movement of the bolt. By doing so this particularly minimises the ability of persons being able to drive back the bolt.

The arrangements described herein provide an improvement that prevents or makes even more difficult the driving back of the bolt.

The anti-thrust member and bolt-restraint mechanism described herein are applicable to many other different types of bolt module. For example, although the anti-thrust member and bolt-restraint mechanism have been described with regard to the example described in GB 2520666 B, the anti-thrust member and bolt-restraint mechanism may also be applicable to the multi-point bolting system of GB 2289084 B by the same applicant.

Furthermore, although we have described the bolt module as being used in combination with a locking module, this may also mot be required. The bolt module be used without locking modules such as for an escape only device with a handle on the inside only offering free exit but not handle or locking module on the outside. In this arrangement the bolt module with anti-thrust mechanism would continue to be used to prevent an assailant from trying to lever the bolt back and breach the door from the external side.

Examples of the present disclosure can be implemented according to at least the following clauses:

Clause 1: A bolt module comprising: a bolt moveable between a thrown position and a retracted position; an anti-thrust member moveable between a release position in which the bolt can be retracted and a plurality of blocking positions obstructing driving back of the bolt under action of an external force on the bolt; and a first rotor assembly capable of accepting a drive element, the first rotor assembly arranged to drive the bolt and to move the anti-thrust member between the plurality of blocking positions and the release position.

Clause 2: The bolt module of Clause 1, wherein each of the plurality of blocking positions respectively limits to different extents the driving back of the bolt under action of an external force on the bolt.

Clause 3: The bolt module of Clause 1 or Clause 2, wherein the first rotor assembly is arranged to move the anti-thrust member between a first blocking position, a second blocking position and a release position, wherein the first blocking position obstructs driving back of the bolt when the bolt is at the thrown position, and the second blocking position obstructs driving back of the bolt when the bolt is at a first partially retracted position.

Clause 4: The bolt module of Clause 3, wherein the first rotor assembly is arranged to move the anti-thrust member between a first blocking position, a second blocking position, a third blocking position and a release position, wherein the third blocking position obstructs driving back of the bolt when the bolt is at a second partially retracted position in which the bolt is retracted further than when at the first partially retracted position.

Clause 5: The bolt module of any preceding Clause, wherein the anti-thrust member comprises a plurality of stopping faces against which movement of the bolt is obstructed.

Clause 6: The bolt module of Clause 5, wherein the bolt has a back face and the anti-thrust member is arranged such that the back face is respectively obstructed by one of the stopping faces of the anti-thrust member dependent on whether bolt is thrown or partially retracted.

Clause 7: The bolt module of Clause 5 or Clause 6, wherein the plurality of stopping faces form a series of steps providing respective positions into which the bolt is received and movement is obstructed.

Clause 8: The bolt module of Clause 7, wherein the series of steps provides blocking at increasingly retracted positions of the bolt as the antithrust member is moved increasingly from the path of the bolt.

Clause 9: The bolt module of any preceding Clause, further comprising a bolt restraint and trigger, the bolt restraint configured to operate on the bolt and engage with the bolt when the bolt is moved to the retracted position so as to restrain the bolt in that position, and the trigger extending from the bolt module and arranged such that on striking of the trigger the trigger pushes against the bolt restraint releasing the bolt.

Clause 10: The bolt module of Clause 9, wherein the bolt restraint comprises a plurality of restraint fingers configured to operate on the bolt and engage with the bolt, each of the fingers configured to come into engagement with the bolt at different partial retraction positions of the bolt to restrain the bolt in that position.

Clause 11: The bolt module of Clause 10, wherein the restraint fingers are arranged such that the further the bolt is retracted the greater the number of restraint fingers engaged with the bolt.

Clause 12: The bolt module of Clause 10 to 11, wherein the bolt comprises a restraint shoulder and the restraint fingers are biased to slide into a recess behind the shoulder as the bolt is retracted.

Clause 13: The bolt module of Clause 11 or 12, wherein the fingers comprise tabs for engaging with the bolt, each of the tabs having an operative face which is respectively spaced coplanar from the tabs of the other fingers to provide engagement with the recess of the bolt at different respective positions of the bolt.

Clause 14: The bolt module of any of claims 10 to 13, wherein the trigger is arranged such that on striking the trigger the trigger pushes against the fingers to retract the fingers from the recess and release the bolt.

Clause 15: The bolt module of any of Clauses 10 to 14, wherein the anti-thrust member and restraint fingers are arranged such that when at least one of the fingers engages in the recess in the bolt, the anti-thrust member is at one of the blocking positions blocking driving back of the bolt from a partially retracted position.

Clause 16: The bolt module of any preceding Clause, wherein the bolt and first rotor assembly are arranged such that there is lost motion there between when an external force is applied on the bolt to drive back the bolt, such that the rotor assembly is not driven by the action of the external force.

Clause 17: The bolt module of Clause 16, further comprising a slider arranged to transmit motion from the first rotor assembly to the bolt and including said lost motion between the bolt and slider such that the first rotor assembly is not driven when an external force is applied on the bolt.

Clause 18: The bolt module of Clause 16 or Clause 17, wherein the anti-thrust member is biased to drive the first rotor assembly to throw the bolt.

Clause 19: The bolt module of any preceding Clause, wherein the first rotor assembly comprises an inside rotor capable of accepting an inside drive element and an outside rotor capable of accepting an outside drive element, the inside rotor and outside rotor arranged for rotation about a common axis and having lost-motion there between.

Clause 20: The bolt module of any of Clauses 16 to 19, further comprising a second rotor assembly, the first and second rotor assemblies disposed on opposing sides of the bolt, each rotor assembly being capable of accepting drive elements each for driving the bolt between the thrown and retracted positions, wherein the rotor assemblies are arranged such that to retract the bolt, a drive element accepted by the first rotor assembly is rotated in an opposite direction to a drive element accepted by the second rotor assembly.

Clause 21: The bolt module of Clause 20 when dependent on Clause 17, wherein the slider is arranged between first and second rotor assemblies for transmitting drive between said rotor assemblies.

Clause 22: The bolt module of Clause 20 or 21, adapted for securing a leaf having an inside and an outside, wherein at least one of the first and second rotor assemblies is capable of accepting both inside and outside drive elements each for driving the bolt between thrown and retracted positions from the respective side.

Clause 23: The bolt module of Clause 22, wherein at least one of the first and second rotor assemblies is arranged to receive a locking member from a locking module, said rotor assembly arranged such that at least part of said rotor assembly is for locking by the locking member so as to prevent the outside drive element from driving the bolt.

Clause 24: A bolt module comprising: a bolt moveable between a thrown position, a partially retracted position and a retracted position; a first rotor assembly capable of accepting a drive element, the first rotor assembly arranged to drive the bolt between the thrown position, the partially retracted position and the retracted position; and a bolt restraint latch and trigger, the bolt restraint latch configured to operate on the bolt and engage with the bolt when the bolt is moved to a retracted position, or a partially retracted position, so as to restrain the bolt in that position, and the trigger extending from the bolt module and arranged such that on striking of the trigger the trigger pushes against the bolt restraint latch releasing the bolt.

Clause 25: The bolt module of Clause 24, wherein the restraint latch comprises a plurality of restraint fingers configured to operate on the bolt and engage with the bolt, each of the fingers configured come into engagement with the bolt at different retraction positions of the bolt to restrain the bolt in that position.

Clause 26: A leaf or door comprising the bolt module of any preceding Clause, wherein the bolt module is mounted on the leaf for securing the leaf or door.

The person skilled in the art will readily appreciate that various modifications and alterations may be made to the above described bolt module. The modifications may be made without departing from the scope of the appended claims. For example, the rotors and sliders are shown as gears driving racks, but may be instead arranged with levers or belts. Furthermore, the rotors are described as being located on opposing sides of the bolt. This may not always be necessary. Variations in the actual shapes of the parts such as the rotors, sliders, bolt, and modules may also be made without diverging from the general scope of the present invention.

The invention claimed is:

1. A bolt module comprising:

a bolt moveable between a thrown position and a retracted position;

an anti-thrust member moveable between a release position in which the bolt can be retracted and a plurality of blocking positions obstructing driving back of the bolt under action of an external force on the bolt, and a first rotor assembly capable of accepting a drive element, the first rotor assembly arranged to drive the bolt and to move the anti-thrust member between the plurality of blocking positions and the release position, wherein the anti-thrust member is biased, the bias configured to drive the anti-thrust member into a path of the rear of the bolt, the anti-thrust member comprising a plurality of stopping faces against which movement of the bolt is obstructed, each stopping face offset in the direction of movement of the bolt and offset in the direction of movement of the anti-thrust member to the subsequent stopping face so as to form a series of steps, and the first rotor assembly arranged such that as the first rotor assembly retracts the bolt, the first rotor assembly retracts the anti-thrust member against the bias and moves a first stopping face transversely out of the path of the rear of the bolt to allow further retraction of the bolt and limit driving back of the bolt under action of an external force to a second stopping face stepped back from the first stopping face, the second stopping face in the path of the bolt.

2. The bolt module of claim 1, wherein each of the plurality of blocking positions respectively limits to different extents the driving back of the bolt under action of an external force on the bolt.

3. The bolt module of claim 1, wherein the first rotor assembly is arranged to move the anti-thrust member between a first blocking position, a second blocking position and a release position, wherein the first blocking position obstructs driving back of the bolt when the bolt is at the thrown position, and the second blocking position obstructs driving back of the bolt when the bolt is at a first partially retracted position.

4. The bolt module of claim 3, wherein the first rotor assembly is arranged to move the anti-thrust member between a first blocking position, a second blocking position, a third blocking position and a release position, wherein the third blocking position obstructs driving back of the bolt when the bolt is at a second partially retracted position in which the bolt is retracted further than when at the first partially retracted position.

5. The bolt module of claim 1, wherein the anti-thrust member comprises a plurality of stopping faces against which movement of the bolt is obstructed.

6. The bolt module of claim 5, wherein the bolt has a back face and the anti-thrust member is arranged such that the back face is respectively obstructed by one of the stopping faces of the anti-thrust member dependent on whether bolt is thrown or partially retracted.

7. The bolt module of claim 5, wherein the plurality of stopping faces form a series of steps providing respective positions into which the bolt is received and movement is obstructed.

8. The bolt module of claim 7, wherein the series of steps provides blocking at increasingly retracted positions of the bolt as the antithrust member is moved increasingly from the path of the bolt.

9. A bolt module comprising:

a bolt moveable between a thrown position and a retracted position;

an anti-thrust member moveable between a release position in which the bolt can be retracted and a plurality of blocking positions obstructing driving back of the bolt under action of an external force on the bolt; and a first rotor assembly capable of accepting a drive element, the first rotor assembly arranged to drive the bolt and to move the anti-thrust member between the plurality of blocking positions and the release position, the bolt module further comprising a bolt restraint and trigger, the bolt restraint configured to operate on the bolt and engage with the bolt when the bolt is moved to the retracted position so as to restrain the bolt in that position, and the trigger extending from the bolt module and arranged such that on striking of the trigger the trigger pushes against the bolt restraint releasing the bolt, wherein the bolt restraint comprises a plurality of restraint fingers configured to operate on the bolt and engage with the bolt, each of the fingers configured to come into engagement with the bolt at different partial retraction positions of the bolt to restrain the bolt in that position.

10. The bolt module of claim 9, wherein the restraint fingers are arranged such that the further the bolt is retracted the greater the number of restraint fingers engaged with the bolt.

11. The bolt module of claim 9, wherein the bolt comprises a restraint shoulder and the restraint fingers are biased to slide into a recess behind the shoulder as the bolt is retracted.

12. The bolt module of claim 10, wherein the fingers comprise tabs for engaging with the bolt, each of the tabs having an operative face which is respectively spaced coplanar from the tabs of the other fingers to provide engagement with the recess of the bolt at different respective positions of the bolt.

13. The bolt module of claim 9, wherein the trigger is arranged such that on striking the trigger the trigger pushes against the fingers to retract the fingers from the recess and release the bolt.

14. The bolt module of claim 9, wherein the anti-thrust member and restraint fingers are arranged such that when at least one of the fingers engages in the recess in the bolt, the anti-thrust member is at one of the blocking positions blocking driving back of the bolt from a partially retracted position.

15. The bolt module of claim 1, wherein the bolt and first rotor assembly are arranged such that there is lost motion there between when an external force is applied on the bolt to drive back the bolt, such that the rotor assembly is not driven by the action of the external force.

16. The bolt module of claim 15, further comprising a slider arranged to transmit motion from the first rotor assembly to the bolt and including said lost motion between the bolt and slider such that the first rotor assembly is not driven when an external force is applied on the bolt.

17. The bolt module of claim 15, wherein the anti-thrust member is biased to drive the first rotor assembly to throw the bolt.

18. The bolt module of claim 1, wherein the first rotor assembly comprises an inside rotor capable of accepting an inside drive element and an outside rotor capable of accepting an outside drive element, the inside rotor and outside rotor arranged for rotation about a common axis and having lost-motion there between.

19. The bolt module of claim 15, further comprising a second rotor assembly, the first and second rotor assemblies disposed on opposing sides of the bolt, each rotor assembly being capable of accepting drive elements each for driving the bolt between the thrown and retracted positions, wherein the rotor assemblies are arranged such that to retract the bolt, a drive element accepted by the first rotor assembly is rotated in an opposite direction to a drive element accepted by the second rotor assembly.

20. The bolt module of claim 16, further comprising a second rotor assembly, the first and second rotor assemblies disposed on opposing sides of the bolt, each rotor assembly being capable of accepting drive elements each for driving the bolt between the thrown and retracted positions, wherein the rotor assemblies are arranged such that to retract the bolt, a drive element accepted by the first rotor assembly is rotated in an opposite direction to a drive element accepted by the second rotor assembly, wherein the slider is arranged between first and second rotor assemblies for transmitting drive between said rotor assemblies.

21. The bolt module of claim 19, adapted for securing a leaf having an inside and an outside, wherein at least one of the first and second rotor assemblies is capable of accepting both inside and outside drive elements each for driving the bolt between thrown and retracted positions from the respective side.

22. The bolt module of claim 21, wherein at least one of the first and second rotor assemblies is arranged to receive a locking member from a locking module, said rotor assembly arranged such that at least part of said rotor assembly is for locking by the locking member so as to prevent the outside drive element from driving the bolt.

23. A bolt module comprising:

a bolt moveable between a thrown position, a partially retracted position and a retracted position;

a first rotor assembly capable of accepting a drive element, the first rotor assembly arranged to drive the bolt between the thrown position, the partially retracted position and the retracted position; and a bolt restraint latch and trigger, the bolt restraint latch configured to operate on the bolt and engage with the bolt when the bolt is moved to a retracted position, or a partially retracted position, so as to restrain the bolt in that position, and the trigger extending from the bolt module and arranged such that on striking of the trigger the trigger pushes against the bolt restraint latch releasing the bolt, wherein the restraint latch comprises a plurality of restraint fingers configured to operate on the bolt and engage with the bolt, each of the fingers configured come into engagement with the bolt at different retraction positions of the bolt to restrain the bolt in that position.

24. A leaf or door comprising the bolt module of claim 1, wherein the bolt module is mounted on the leaf or door for securing the leaf or door.

25. A leaf or door comprising the bolt module of claim 23, wherein the bolt module is mounted on the leaf or door for securing the leaf or door.

26. A bolt module comprising:

a bolt moveable between a thrown position and a retracted position;

an anti-thrust member moveable between a release position in which the bolt can be retracted and a plurality of blocking positions obstructing driving back of the bolt under action of an external force on the bolt; and a first rotor assembly capable of accepting a drive element, the first rotor assembly arranged to drive the bolt and to move the anti-thrust member between the plurality of blocking positions and the release position, wherein the first rotor assembly comprises an inside rotor capable of accepting an inside drive element and an outside rotor capable of accepting an outside drive element, the inside rotor and outside rotor arranged for rotation about a common axis and having lost-motion there between.

* * * * *